United States Patent
Fijolek et al.

(10) Patent No.: US 6,577,642 B1
(45) Date of Patent: Jun. 10, 2003

(54) METHOD AND SYSTEM FOR VIRTUAL NETWORK ADMINISTRATION WITH A DATA-OVER CABLE SYSTEM

(75) Inventors: John G. Fijolek, Naperville, IL (US); Nurettin B. Beser, Evanston, IL (US); Philip T. Robinson, Lake Barrington, IL (US); Levent Gun, Lake Forest, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/232,762

(22) Filed: Jan. 15, 1999

(51) Int. Cl.$^7$ ................................................. H04J 3/16
(52) U.S. Cl. ........................................................ 370/465
(58) Field of Search ................................. 370/465, 466, 370/474, 389, 399, 428, 412, 413, 351, 352, 403, 401, 395.1, 522, 524; 713/201, 1, 200; 707/203; 709/219, 217, 220, 222, 225, 203, 218; 380/23, 30, 21, 24; 375/222; 348/12; 455/3.1; 340/286.02

(56) References Cited

U.S. PATENT DOCUMENTS

| | | |
|---|---|---|
| 4,644,533 A | 2/1987 | Braff et al. .................... 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ................ 364/900 |
| 5,138,712 A | 8/1992 | Corbin ......................... 395/700 |
| 5,301,273 A | 4/1994 | Konishi ....................... 395/200 |
| 5,347,304 A | 9/1994 | Moura et al. |
| 5,430,727 A | 7/1995 | Callon ..................... 370/85.13 |
| 5,442,749 A | 8/1995 | Northcutt et al. ...... 395/200.09 |
| 5,488,412 A | 1/1996 | Majeti et al. |
| 5,489,897 A | 2/1996 | Inoue .................... 340/870.39 |
| 5,583,931 A | 12/1996 | Schneider et al. |
| 5,586,121 A | 12/1996 | Moura et al. |
| 5,598,410 A | 1/1997 | Stone ......................... 370/469 |
| 5,600,717 A | 2/1997 | Schneider et al. |
| 5,606,606 A | 2/1997 | Schneider et al. |
| 5,608,446 A | 3/1997 | Carr et al. |
| 5,610,910 A | 3/1997 | Focsaneanu et al. ........ 370/351 |
| 5,623,542 A | 4/1997 | Schneider et al. |
| 5,623,601 A | 4/1997 | Vu ........................ 395/187.01 |
| 5,636,211 A | 6/1997 | Newlin et al. |

(List continued on next page.)

OTHER PUBLICATIONS

"Radio Frequency Interface Specification (Interim Specification) SP–RFI–105–991105", MCNS Holdings, L.P., 1999, pp. ii to 202.

(List continued on next page.)

*Primary Examiner*—Dang Ton

(57) ABSTRACT

A method and system for virtual network administration with a data-over-cable system. A virtual networking tag and a network address (e.g., an Internet Protocol address) assigned by a network other than a data-over-cable system is used to provide a virtual network to one or more network devices, such as cable modems via a data-over-cable system. The virtual networking tag may also be used to request a desired service class (e.g., Class-of-Service, Quality-of-Service, Type-of-Service, Service Level Agreements, etc.), for a desired end-to-end networking service (e.g., Voice over Internet Protocol). The virtual networking tag can be mapped to a data-over-cable service class. The data-over-cable service class can be mapped into a transport service class for a transport network. The virtual networking tag is used to provide a desired end-to-end networking service from a network device on a first external network (e.g., an Ethernet Local Area Network), through the data-over-cable system, through a transport network (e.g., Asymmetric Digital Subscriber Line, Asynchronous Transfer Mode, Frame Relay, Integrated Services Digital Network, Synchronous Optical Network, Voice over Internet Protocol, etc.) and to a second external network (e.g., another Ethernet Local Area Network). The method and system are used to provide a variety of networking services via and through a data-over-cable system.

36 Claims, 21 Drawing Sheets

U.S. PATENT DOCUMENTS

| | | |
|---|---|---|
| 5,675,732 A | 10/1997 | Majeti et al. |
| 5,675,742 A | 10/1997 | Jain et al. ............... 395/200 |
| 5,678,041 A | 10/1997 | Baker et al. ............. 395/609 |
| 5,708,654 A | 1/1998 | Arndt et al. ............. 370/242 |
| 5,710,885 A | 1/1998 | Bondi .................... 709/224 |
| 5,724,510 A | 3/1998 | Arndt et al. ........... 395/200.5 |
| 5,761,602 A | 6/1998 | Wagner et al. ............ 455/3.1 |
| 5,778,181 A | 7/1998 | Hidary et al. ......... 395/200.48 |
| 5,790,198 A | 8/1998 | Roop et al. ............. 348/460 |
| 5,790,548 A | 8/1998 | Sistanizadeh et al. ...... 370/401 |
| 5,790,677 A | 8/1998 | Fox et al. ............... 380/24 |
| 5,790,770 A | 8/1998 | McClure et al. ....... 395/200.61 |
| 5,790,806 A | 8/1998 | Koperda .............. 395/200.82 |
| 5,793,747 A | 8/1998 | Kline .................... 370/230 |
| 5,799,086 A | 8/1998 | Sudia .................... 380/23 |
| 5,805,804 A | 9/1998 | Laursen et al. ............ 348/7 |
| 5,809,252 A | 9/1998 | Beighe et al. ........ 395/200.57 |
| 5,812,819 A | 9/1998 | Rodwin et al. ........... 395/500 |
| 5,815,664 A | 9/1998 | Asano |
| 5,818,845 A | 10/1998 | Moura et al. ............. 370/449 |
| 5,819,028 A | 10/1998 | Manghirmalani et al. ............... 395/185.1 |
| 5,819,042 A | 10/1998 | Hansen ................... 714/756 |
| 5,828,655 A | 10/1998 | Moura et al. ............. 370/326 |
| 5,828,666 A | 10/1998 | Focsaneanu et al. ........ 370/389 |
| 5,835,720 A | 11/1998 | Nelson et al. ......... 395/200.54 |
| 5,835,727 A | 11/1998 | Wong et al. .......... 395/200.68 |
| 5,841,777 A | 11/1998 | Cohen .................... 370/433 |
| 5,848,233 A | 12/1998 | Radia et al. ........... 395/187.01 |
| 5,852,721 A | 12/1998 | Dillon et al. .......... 395/200.47 |
| 5,854,901 A | 12/1998 | Cole et al. .............. 709/245 |
| 5,859,852 A | 1/1999 | Moura et al. ............. 370/449 |
| 5,864,679 A | 1/1999 | Kanai et al. .............. 709/238 |
| 5,870,134 A | 2/1999 | Laubach et al. ............ 348/12 |
| 5,872,523 A | 2/1999 | Dellaverson et al. ... 340/825.52 |
| 5,884,024 A | 3/1999 | Lim et al. ............ 395/187.01 |
| 5,892,754 A | 4/1999 | Kompella et al. .......... 370/236 |
| 5,894,479 A | 4/1999 | Mohammed ................. 370/401 |
| 5,903,558 A | 5/1999 | Jones et al. .............. 370/351 |
| 5,909,549 A | 6/1999 | Compliment et al. ........ 709/223 |
| 5,913,037 A | 6/1999 | Spofford et al. ....... 395/200.56 |
| 5,915,119 A | 6/1999 | Cone .................. 395/750.02 |
| 5,922,049 A | 7/1999 | Radia et al. ............. 709/220 |
| 5,922,051 A | 7/1999 | Sidey .................... 709/223 |
| 5,923,659 A | 7/1999 | Curry et al. ............. 370/401 |
| 5,926,458 A | 7/1999 | Yin ...................... 370/230 |
| 5,929,850 A | 7/1999 | Broadwin et al. |
| 5,943,604 A | 8/1999 | Chen et al. .............. 455/5.1 |
| 5,954,797 A | 9/1999 | Sidey .................... 709/223 |
| 5,958,007 A | 9/1999 | Lee et al. ............... 709/219 |
| 5,974,453 A | 10/1999 | Anderson et al. ........... 709/220 |
| 5,982,748 A | 11/1999 | Yin et al. ............... 370/232 |
| 5,987,524 A | 11/1999 | Yoshida et al. ............ 709/245 |
| 5,991,292 A | 11/1999 | Focsaneanu et al. ........ 370/352 |
| 5,991,306 A | 11/1999 | Burns et al. ............. 370/429 |
| 5,996,076 A | 11/1999 | Rowney et al. ............ 713/201 |
| 5,999,536 A | 12/1999 | Kawafuji et al. .......... 370/401 |
| 6,003,077 A | 12/1999 | Bawden et al. ............ 709/223 |
| 6,005,851 A | 12/1999 | Craddock et al. .......... 370/329 |
| 6,006,264 A | 12/1999 | Colby et al. ............. 709/226 |
| 6,009,103 A | 12/1999 | Woundy .................... 370/401 |
| 6,012,088 A | 1/2000 | Li et al. ................ 709/219 |
| 6,013,107 A | 1/2000 | Blackshear et al. ......... 703/229 |
| 6,014,545 A | 1/2000 | Wu et al. ................ 455/3.1 |
| 6,018,767 A | 1/2000 | Fijolek et al. ............ 709/218 |
| 6,031,841 A | 2/2000 | Woundy .................... 370/410 |
| 6,032,019 A | 2/2000 | Chen et al. |
| 6,041,041 A | 3/2000 | Ramanathan et al. ........ 370/241 |
| 6,046,979 A | 4/2000 | Bauman ................... 370/229 |
| 6,049,546 A | 4/2000 | Ramakrishnan ............. 370/412 |
| 6,049,825 A | 4/2000 | Yamamoto ................. 709/221 |
| 6,049,826 A | 4/2000 | Beser .................... 709/222 |
| 6,052,724 A | 4/2000 | Willie et al. ............ 709/223 |
| 6,058,421 A | 5/2000 | Fijolek et al. ............ 709/225 |
| 6,061,349 A | 5/2000 | Coile et al. ............. 370/389 |
| 6,065,049 A | 5/2000 | Beser .................... 709/218 |
| 6,070,187 A | 5/2000 | Subramaniam et al. ...... 709/220 |
| 6,070,242 A | 5/2000 | Wong et al. .............. 713/201 |
| 6,070,246 A | 5/2000 | Beser .................... 713/201 |
| 6,073,178 A | 6/2000 | Wong et al. .............. 709/229 |
| 6,075,787 A | 6/2000 | Bobeck et al. ............ 370/395 |
| 6,091,709 A | 7/2000 | Harrison et al. .......... 370/235 |
| 6,094,431 A | 7/2000 | Yamato et al. ............ 370/395 |
| 6,104,700 A | 8/2000 | Haddock et al. ........... 370/235 |
| 6,112,258 A | 8/2000 | Miller et al. ............. 710/19 |
| 6,122,254 A | 9/2000 | Aydemir et al. ........... 370/235 |
| 6,128,298 A | 10/2000 | Wootton et al. ........... 370/392 |
| 6,130,879 A | 10/2000 | Liu ...................... 370/230 |
| 6,130,880 A | 10/2000 | Naudus et al. ............ 370/235 |
| 6,137,792 A | 10/2000 | Jonas et al. ............. 370/354 |
| 6,137,793 A | 10/2000 | Gorman et al. ............ 370/360 |
| 6,148,410 A | 11/2000 | Baskey et al. ............. 714/4 |
| 6,157,965 A | 12/2000 | Mohammed et al. .......... 710/8 |
| 6,170,061 B1 | 1/2001 | Beser .................... 713/201 |
| 6,178,455 B1 | 1/2001 | Schutte et al. ........... 709/228 |
| 6,185,624 B1 | 2/2001 | Fijolek et al. ............ 709/239 |
| 6,189,102 B1 | 2/2001 | Beser .................... 713/201 |
| 6,208,656 B1 | 3/2001 | Hrastar et al. ........... 370/401 |
| 6,212,563 B1 | 4/2001 | Beser .................... 709/227 |
| 6,216,171 B1 | 4/2001 | Isono et al. ............. 709/250 |
| 6,223,222 B1 | 4/2001 | Fijolek et al. ............ 709/227 |
| 6,240,464 B1 | 5/2001 | Fijolek et al. ............ 709/250 |
| 6,260,072 B1 | 7/2001 | Rodriguez-Moral ........ 709/241 |
| 6,269,099 B1 | 7/2001 | Borella et al. ........... 370/389 |
| 6,272,150 B1 | 8/2001 | Hrastar .................. 370/486 |
| 6,275,853 B1 | 8/2001 | Beser et al. ............. 709/223 |
| 6,295,554 B1 | 9/2001 | Karadogan ................ 709/219 |
| 6,301,223 B1 | 10/2001 | Hrastar et al. ........... 370/227 |
| 6,301,618 B1 | 10/2001 | Sitaraman et al. ......... 709/227 |
| 6,308,328 B1 | 10/2001 | Bowcutt et al. ............ 725/111 |
| 6,331,987 B1 | 12/2001 | Beser .................... 370/486 |
| 6,332,163 B1 * | 12/2001 | Bowman-Amuah ......... 709/231 |
| 6,337,858 B1 | 1/2002 | Petty et al. ............. 370/356 |
| 6,351,773 B1 | 2/2002 | Fijolek et al. ............ 709/228 |
| 6,370,147 B1 | 4/2002 | Beser .................... 370/401 |
| 6,510,162 B1 | 1/2003 | Fijolek et al. |

OTHER PUBLICATIONS

"Radio Frequency Interface Specification (Interim Specification) SP–RFIv1.1–106–001215", MCNS Holdings, L.P., 2000, pp. ii to 432.

"Radio Frequency Interface Specification (Interim Specification) SP–RFI–I04–980724", MCNS Holdings, L.P., 1997, pp. ii to 196.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

"Cable Modem to Customer Premise Equipment Interface Specification (Interim) Sp–Cmci–102–980317", Multimedia Cable Network Systems (MCNS) Holdings, L.P., 1998, pp. ii to 40.

"Operations Support System Interface Specification Baseline Privacy Interface MIB (Interim) SP–OSSI–B–PI–I01–980331", MCNS Holdings, L.P., 1998, pp. ii to 33.

"Cable Modem Termination System–Network Side Interface Specification (Interim Specification) SP–CMTS–N–SII01–960702", MCNS Holdings, L.P., 1996, pp. ii to 13.

"Removable Security Module Interface Specification (Interim Specification) SP–RSMI0I01–980204", MCNS Holdings, L.P., 1997, pp. ii to 48.

"Baseline Privacy Interface Specification (Interim) SP–B–PI–I01–970922", MCNS Holdings, L.P., 1997, pp. ii to 66.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., 1997, pp. ii to 74.

"Security System Specification (Interim Specification) SP–SSI–I01–970506", MCNS Holdings, L.P., 1997, pp. ii to 103.

"Internet Engineering Task Force, Request for Comments 2131, Dynamic Host Configuration Protocol (DHCP)", Mar. 1997, pp. 1 to 42.

S. Adiraju, J. Fijolek, IPCDN Telephony Return MIB, Internet Engineering Task Force, Internet Draft, "<draft–ietf–ipcdn–tri–mib–00.1.txt>," Mar. 23, 1998, pp. 1 to 26.

"A Solution for the Priority Queue Problem of Deadline–Ordered Service Disciplines," N.R. Figueira IEEE International Conference on Computer Communications and Networks, Sep. 22–25, 1997, pp. 320–325.

* cited by examiner

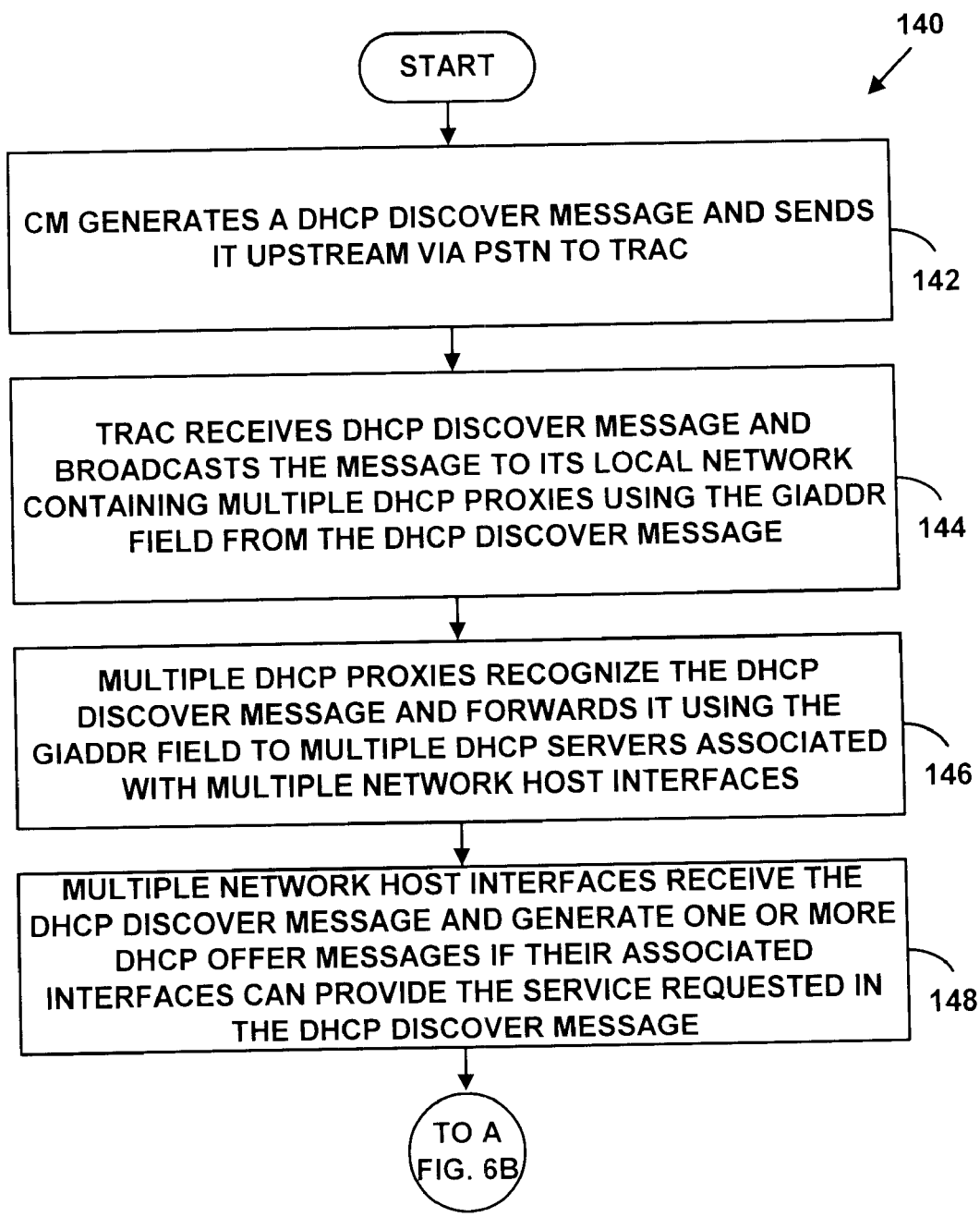

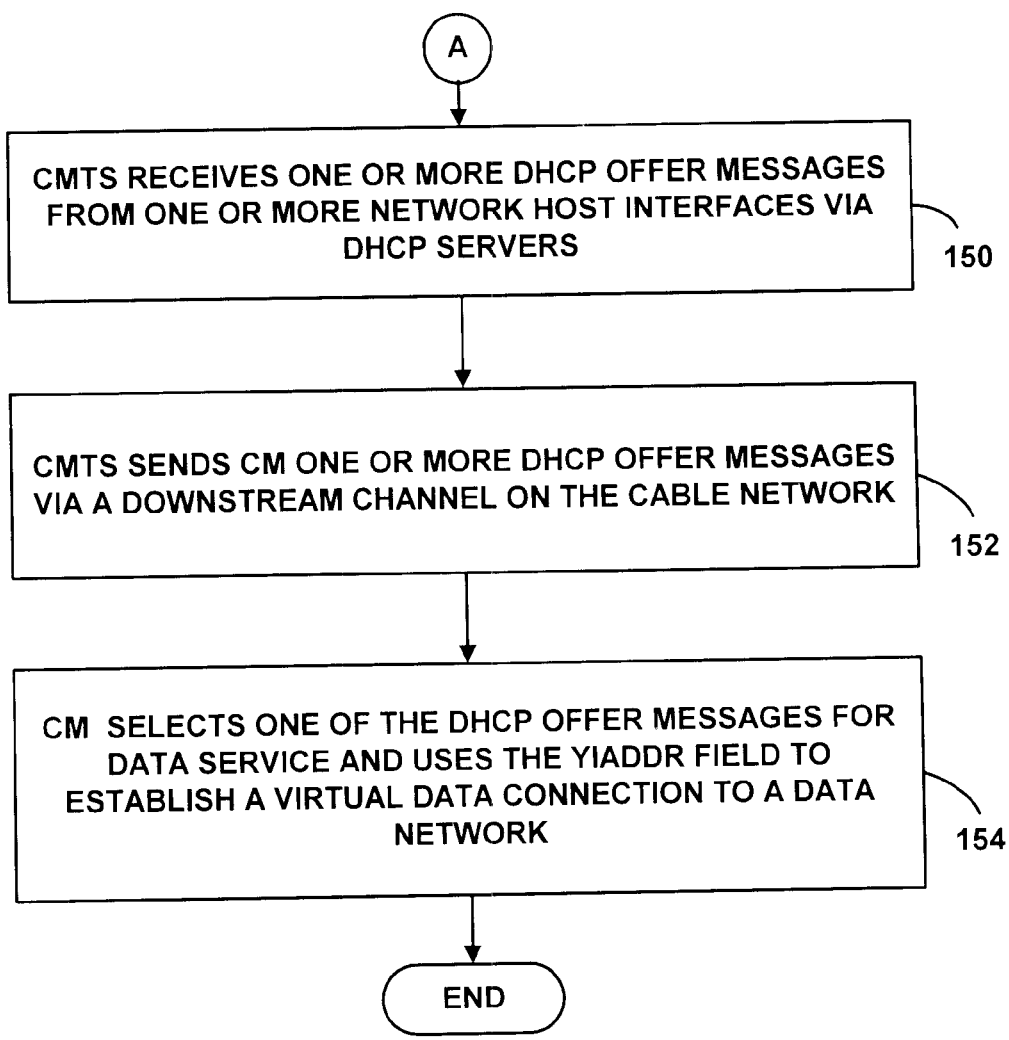

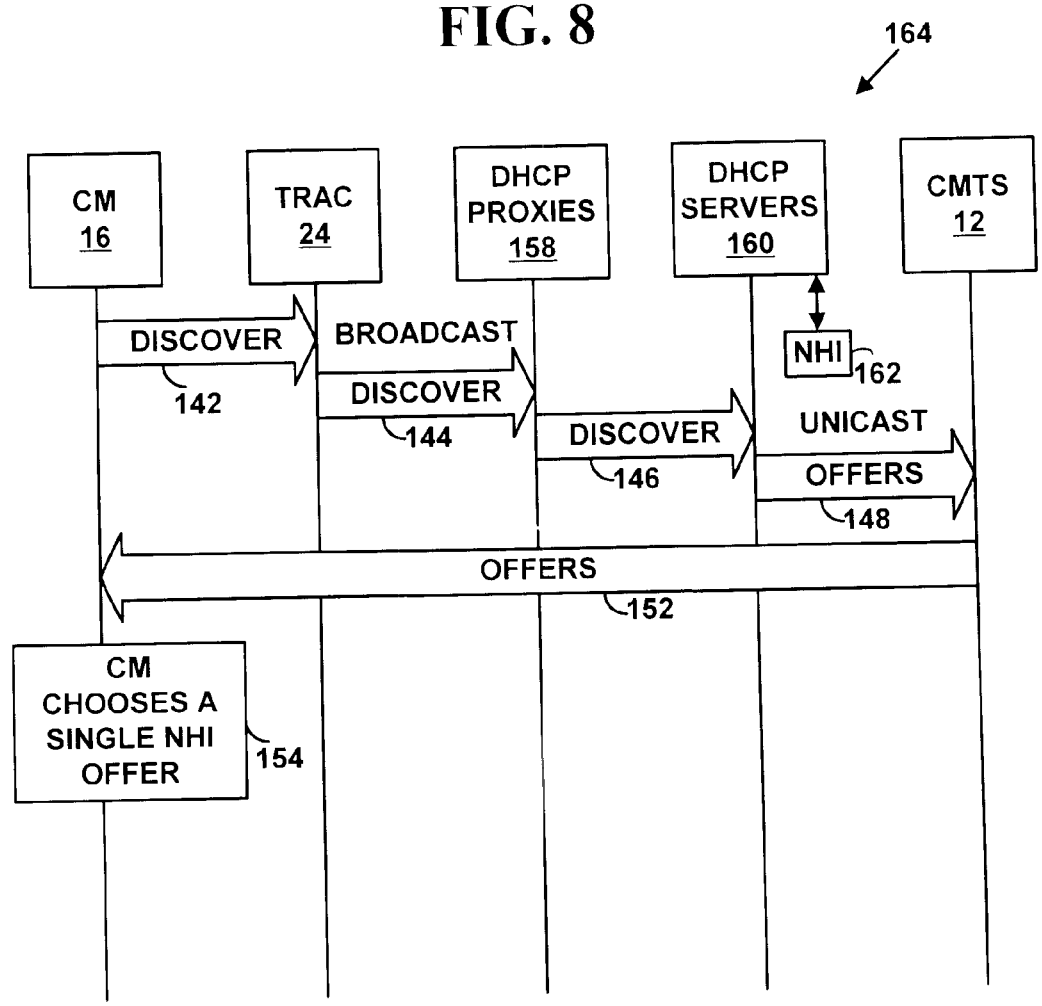

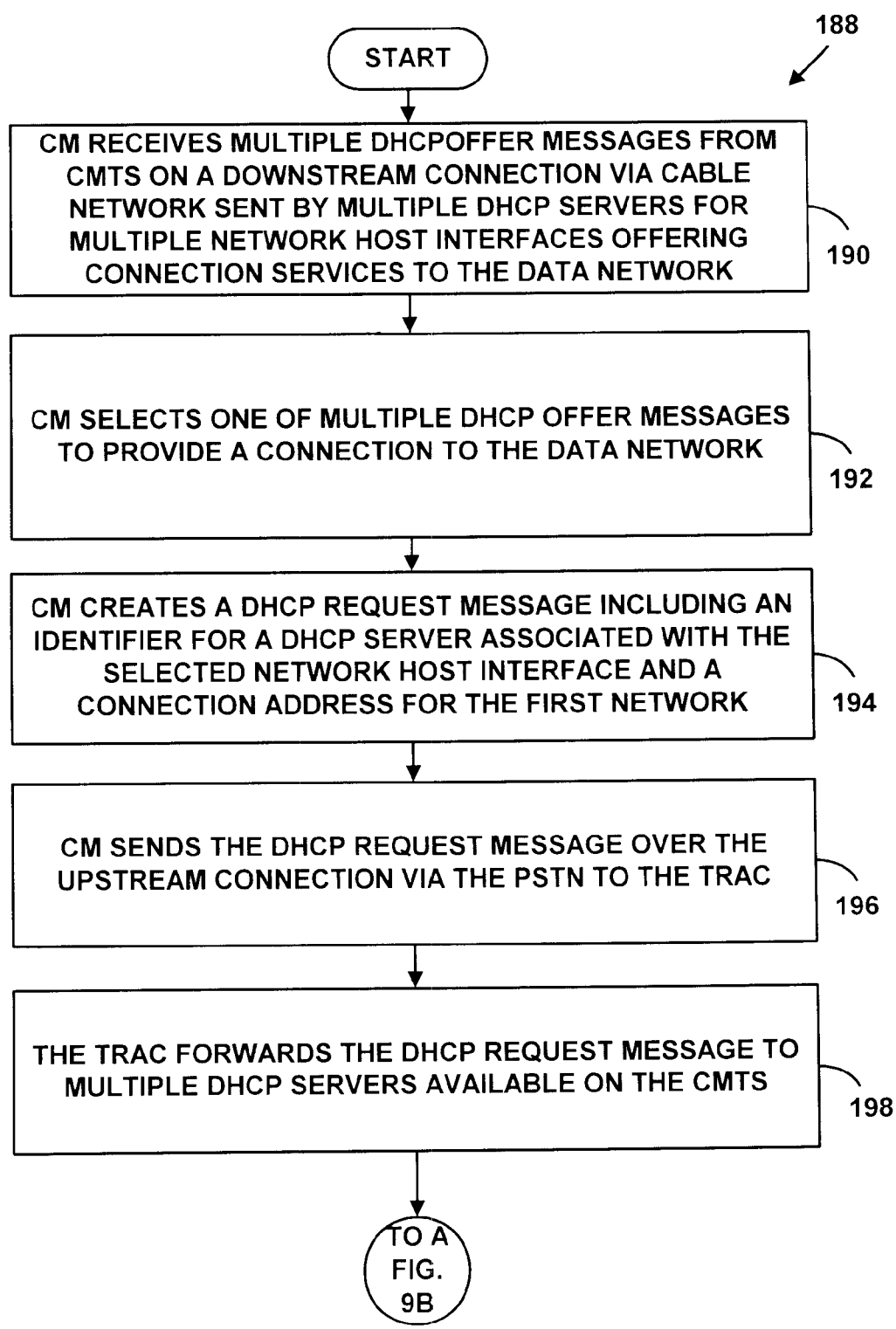

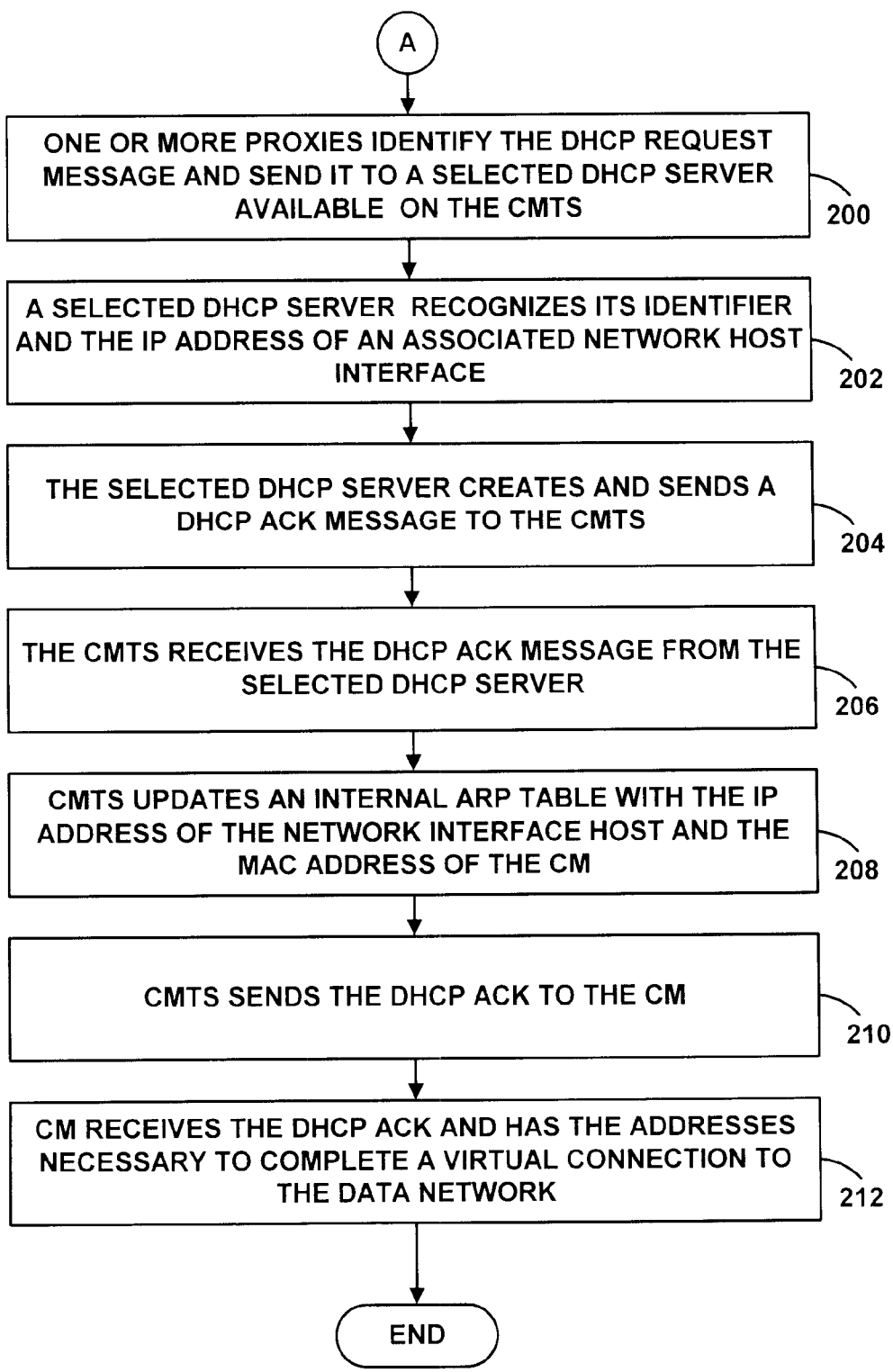

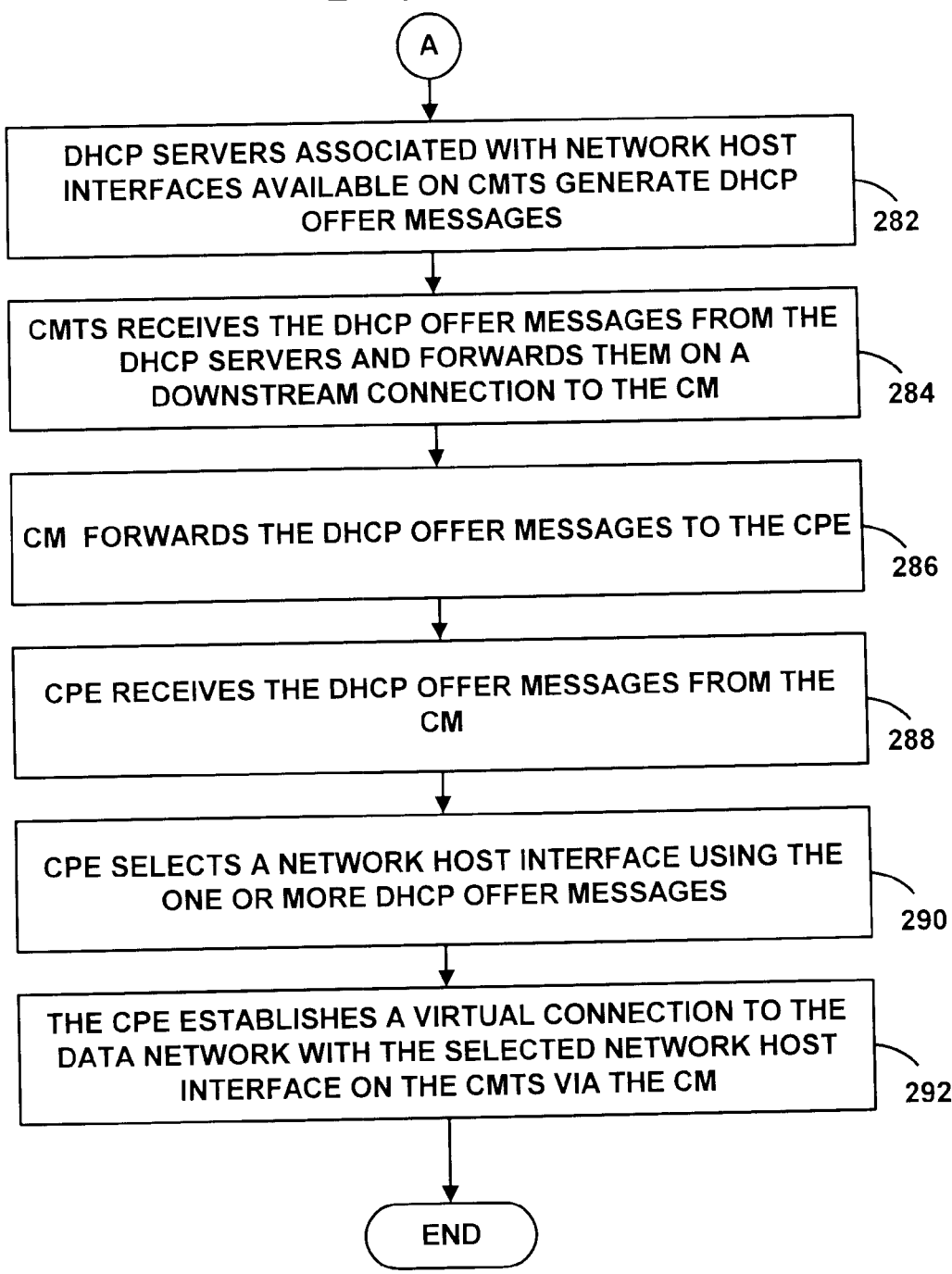

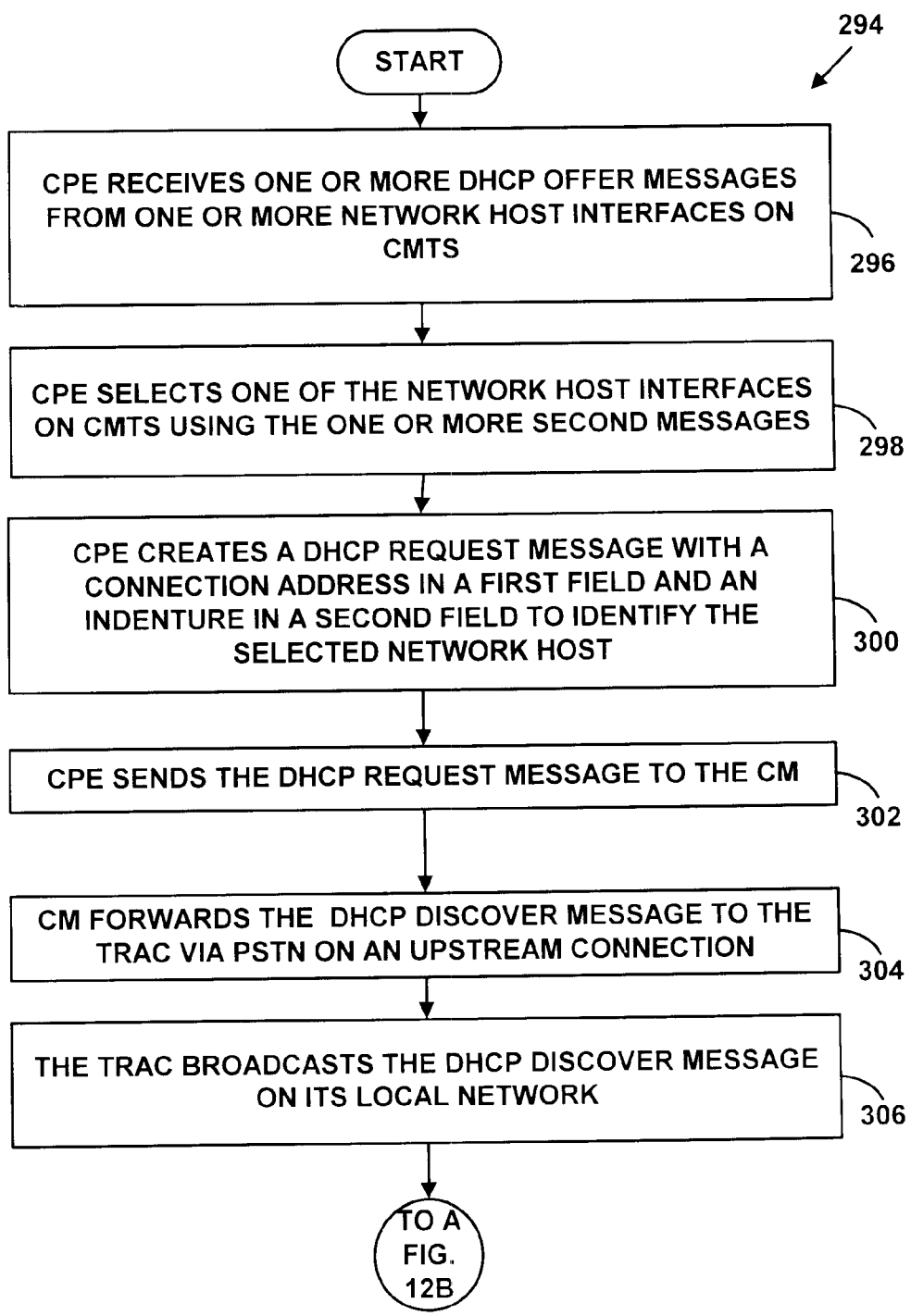

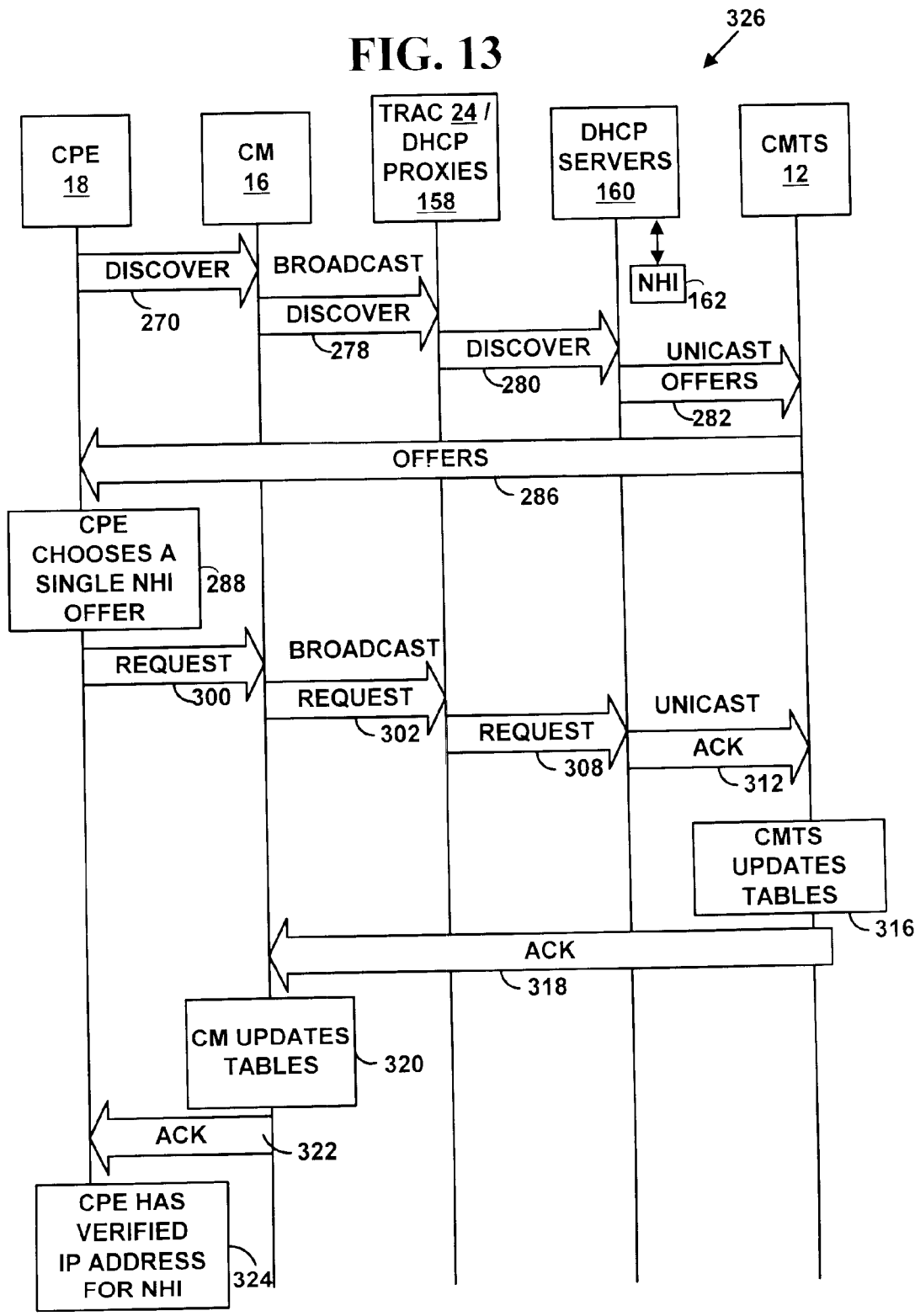

METHOD AND SYSTEM FOR VIRTUAL NETWORK ADMINISTRATION WITH A DATA-OVER CABLE SYSTEM

FIELD OF INVENTION

The present invention relates to communications in computer networks. More specifically, it relates to a method and system for virtual network administration in a data-over-cable system.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+ Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+ Mbps available on a coaxial cable or HFC cable system on a cable television network.

With the explosive growth of the Internet, many customers have desired to use the larger bandwidth of a cable television network to connect to the Internet and other computer networks.

Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps, which is a much larger data rate than can be supported by a modem used over a serial telephone line.

However, many cable television networks provide only uni-directional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as a public switched telephone network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an intranet, a cable modem and customer premise equipment and other network devices have a network address dynamically assigned on the data-over-cable system. Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

A cable modem termination system typically handles requests for services on the data-over-cable system cable modems and customer premise equipment. As is known in the art, the Multimedia Cable Network System ("MCNS") Data Over Cable Service Interface Specification system ("DOCSIS") is typically used on data-over-cable systems to define server interfaces that provide data services. Other interfaces for other services such as Asymmetric Digital Subscriber Lines ("ADSL"), Asynchronous Transfer Mode ("ATM"), Frame Relay, Integrated Services Digital Network ("ISDN"), Synchronous Optical Networks ("SONET") Voice over Internet Protocol ("VoIP"), etc. often require the setting of Quality-of-Service ("QoS"), Class-of-Service ("CoS"), Type-of-Service ("ToS"), Service-Level-Agreements ("SLA"), and other parameters.

As is known in the art, Class-of-Service is typically defined to provide a reliable (e.g., error free, in sequence, with no loss of duplication) transport facility independent of the quality-of-service. Class-of-service parameters include maximum downstream data rates, maximum upstream data rates, upstream channel priority, guaranteed minimum data rates, guaranteed maximum data rate and other parameters. Quality-of-Service typically collectively specifies the performance of a network service that a device expects on a network. Quality-of-Service parameters include transit delay expected to deliver data to a specific destination, the level of security protection from unauthorized monitoring or modification of data, cost for delivery of data, expected residual error probability, the relative priority associated with the data and other parameters. Type-of-Service typically specifies network tradeoffs that can be made to deliver data. Type-of-Service parameters include minimize delay, maximize throughput, maximize reliability, minimize monetary cost and other parameters. A Service Level Agreement is typically an agreement between a user and a service provider, defining a nature for a provided service and establishing a set of metrics to be used to measure a level of service provided against an agreed upon level of service.

A network device, such as a cable modem termination system, typically provides provisioning services, such as bandwidth provisioning, to allow data services and other services to be used over a data-over-cable system. The provisioning services may be used to provide support for a Virtual Private Network ("VPN") or a Virtual Local Area Network ("VLAN"). As is known in the art, a virtual private network or a virtual local area network allows networking equipment that may be physically located in several different places to be used to provide a virtual network to a group of users (e.g., at a corporation, university, organization, etc.). The provisioning service may also be used to provide a desired service class (e.g., Class-of-Service, Quality-of-Service, Type-of-Service, Service Level Agreements, etc.) through a data-over-cable system.

There are several problems associated with using a data-over-cable system to provide support for a virtual private network or a virtual local area network. As was described above, many data-over-cable systems use a Dynamic Host Configuration Protocol to dynamically allocate network addresses such as Internet Protocol addresses. However, it is often desirable not to interfere with a network address, such as an Internet Protocol address, assigned to a network device, such as a cable modem, by a network external to the data-over-cable system (e.g., a Local Area Network ("LAN")). Such network addresses are often used to provide virtual networking services. However, is difficult with existing data-over-cable systems to allow use of network addresses that are not assigned by the data-over-cable system. This prevents many data-over-cable systems from providing selected virtual networking services.

Another problem is that it is often desirable to allow a first network device, such as a cable modem, connected to a first external network and a data-over-cable system, to request a desired service class (e.g., Class-of-Service, Quality-of-Service, Type-of-Service, Service Level Agreements, etc.) for a desired end-to-end networking service through the data-over-cable system to a second network device on a second external network. However, many existing data-over-cable systems do not have the ability to provide a desired service class for a desired end-to-end networking service through the data-over-cable systems. This prevents many data-over-cable systems from providing selected services classes for desired end-to-end networking services though the data-over-cable systems. Thus, it is desirable to allow a data-over-cable system to be used to provide virtual networking services and services classes for desired end-to-end networking services.

SUMMARY OF THE INVENTION

In accordance with preferred embodiments of the present invention, some of the problems associated with providing virtual network services and services classes for desired end-to-end networking services in a data-over-cable system are overcome. A method and system for virtual network administration is provided. One aspect of preferred embodiments of the present invention includes a method for virtual network administration in a data-over-cable system. The method includes receiving a plurality of first messages on a second network device on a data-over-cable system from a plurality of first network devices. The selected first messages from selected first network devices include a virtual networking tag and a network address. The virtual networking tag is used to request a desired networking service on a virtual network. The network address is assigned to a first network device by a network other than the data-over-cable system. It is determined whether a first message includes a virtual networking tag and a network address, and if so, the network address and the virtual networking tag are stored in virtual networking table associated with the second network device. One or more of the network addresses are grouped into a virtual network indicated by a virtual networking tag. The virtual networking tag allows the second network device to provide selected first network devices a desired networking service on the virtual network via the data-over-cable system.

Another aspect of preferred embodiments of the present invention includes a method for virtual network service administration. The method includes receiving a message with a virtual networking tag on a second network device on a data-over-cable system from a first network device connected to the data-over-cable system and a first external network. The virtual networking tag indicates a desired service class for desired end-to-end networking service between the first network device and a third network device on second external network. The desired service class for the desired end-to-end networking service class is mapped into a data-over-cable service class. The data-over-cable service class is mapped into a transport service class for a transport service used on a transport network to provide the desired service class end-to-end for the desired networking service between the first network device and the third network device on the second external network through the data-over-cable system and through the transport network.

In another preferred embodiment of the present invention, a desired service class for a desired end-to-end networking service class indicated by a virtual networking tag is mapped directly into a transport service class by the second network device. In such an embodiment, the step of mapping the desired service class into a data-over-cable service class is not completed.

Preferred embodiments of the present invention may allow first network devices, such as cable modems, to send messages to second network devices, such as cable modem termination systems, including a virtual networking tag. If the messages include a virtual network tag and a network address, the second network device can create a virtual network via a data-over-cable system. The virtual networking tag is also used to request a desired service class for a desired end-to-end networking service. The desired end-toend networking service is provided through a over-cable system a through the transport network using one or more service class mappings. Thus, preferred embodiments of the present invention may provide a variety of service offerings via and through a data-over-cable system.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIGS. 6A and 6B are a flow diagram illustrating a method for discovering hosts in a cable modem system;

FIG. 8 is a block diagram illustrating the message flow of the method illustrated in FIGS. 6A and 6B;

FIGS. 9A and 9B are flow diagrams illustrating a method for resolving discovered host addresses.

FIGS. 11A and 11B are a flow diagram illustrating a method for addressing network host interfaces from customer premise equipment;

FIGS. 12A and 12B are a flow diagram illustrating a method for resolving network host interfaces from customer premise equipment;

FIG. 13 is a block diagram illustrating a message flow for the methods in FIGS. 11A, 11B, and 12A and 12B;

DETAILED DESCRIPTION OF PREFERRED EMBODIMENTS

Exemplary Data-over-cable System

Figure 1:
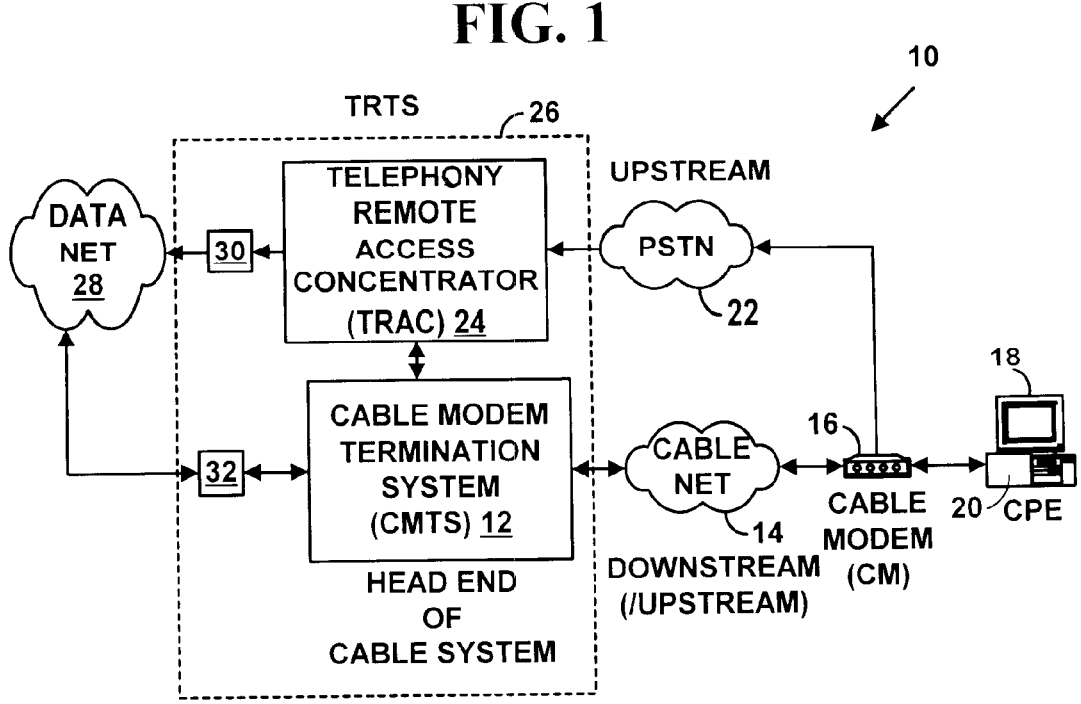
FIG. 1 is a block diagram illustrating a cable modem system with telephony return.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of the CMs 16 are connected to the CMTS 12. The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPE 18 attached (Not illustrated in FIG. 1). In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In another preferred embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without telephony return. The present invention is not limited to cable modems used with telephony return.

In one preferred embodiment of the present invention of the telephony return, the TRAC 24 is a Total Control Telephony Hub by 3Com Corporation of Santa Clara, Calif. One exemplary TRAC 24 as a Total Control Telephony hub is described in U.S. Pat. No. 5,528,595, granted to Dale M. Walsh et al., and incorporated herein by reference. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content severs, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. The present invention may also be used in a data-over-cable system 10 with, or without telephony return.

Network Device Protocol Stack

Figure 2:
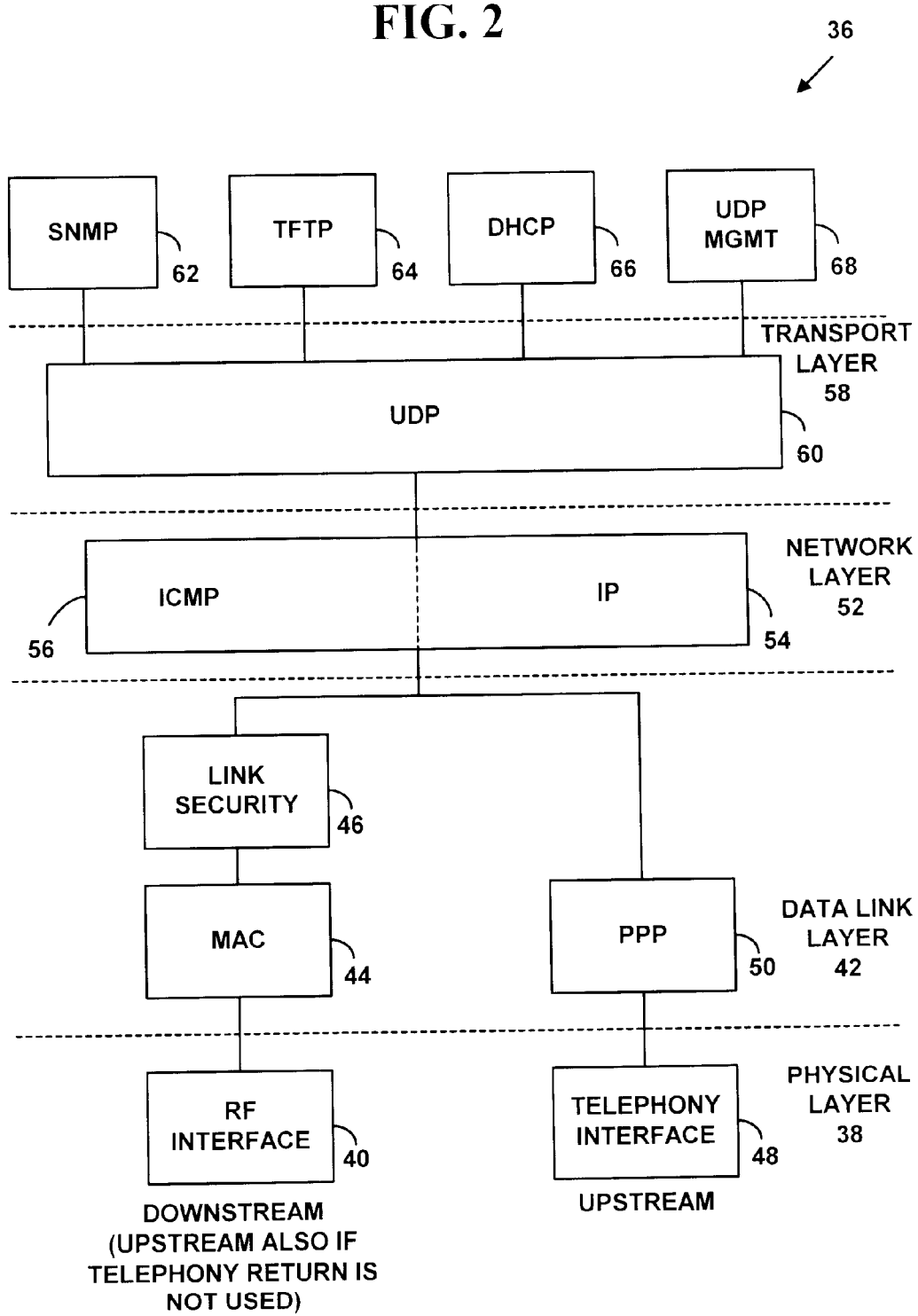
FIG. 2 is a block diagram illustrating a protocol stack for a cable modem.

FIG. 2 is a block diagram illustrating a protocol stack 36 for network devices in data-over-cable system 10. FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used (e.g., Quadrature Phase Shift Keying ("QPSK") modulation). For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream cable connection in a data-over-cable system 10 without telephony return.

For upstream data transmission with telephony return, the CM 16 is connected to the PSTN 22 in physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, modem interfaces (e.g., V.90) or other telephony interfaces could also be used. For example, an Asymmetric Digital Subscribe Link ("ADSL") or an Integrated Services Digital Network ("ISDN") telephony interface could also be used for the telephony interface 48.

Above the telephony interface 48, in the data link layer 42, is a Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663, incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54.

IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see, RFC-971, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see, RFC-768, incorporated herein by reference. Transmission Control Protocol ("TCP") may also be used in the transport layer 58. For more information on TCP see, RFC-793, incorporated by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see, RFC-1157, incorporated herein by reference. TFTP layer 64 is a file transfer protocol used to download files and configuration information. For more information on TFTP layer 64 see, RFC-1350, incorporated herein by reference. The DHCP layer 66 is a protocol for passing configuration information to hosts on an IP 54 network. For more information on the DHCP layer 66 see, RFC-1541, and RFC-2131, incorporated herein by reference. UDP manager 68 distinguishes and routes packets to an appropriate service (e.g., a virtual tunnel). More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the U encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for the CMTS 12, the CM 16 the CPE 18 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem

Figure 3:
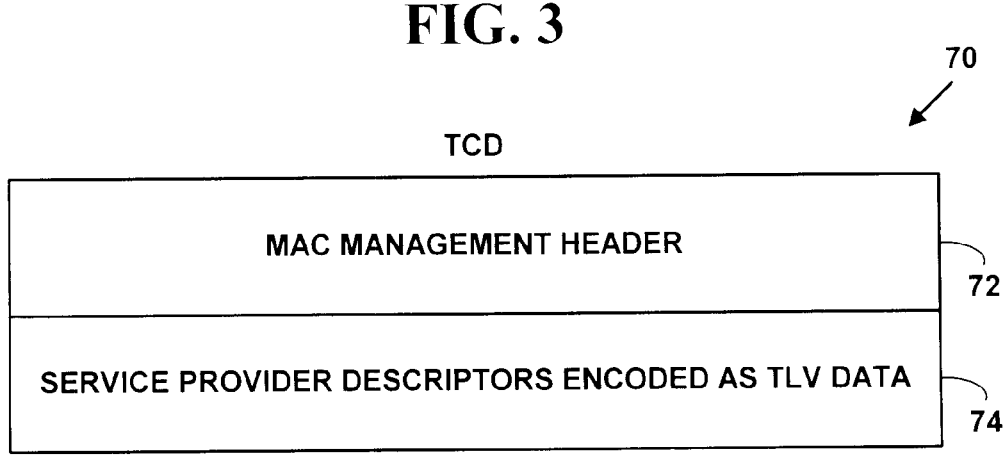
FIG. 3 is a block diagram illustrating a Telephony Channel Descriptor message structure.

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC 44 management message with a management type value of TRI_TCD at a periodic interval (e.g., every 2 seconds). To provide for flexibility, the TCD message parameters are encoded in a Type/Length/Value ("TLV") form. However, other encoding techniques could also be used. FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 is contained within TCD message 70. There may be multiple SPD 74 encodings within a single TCD message 70. There is at least one SPD 74 in the TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use an authentication protocol over the telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic sequence of alphanumeric characters in an ASCII string composed of numbers and letters. |
| DHCP 66 Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP 66 Server | IP 54 address value of a DHCP 66 Server the CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP 50 Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

TABLE 1-continued

| SPD 74 Parameter | Description |
| --- | --- |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

Figure 4:
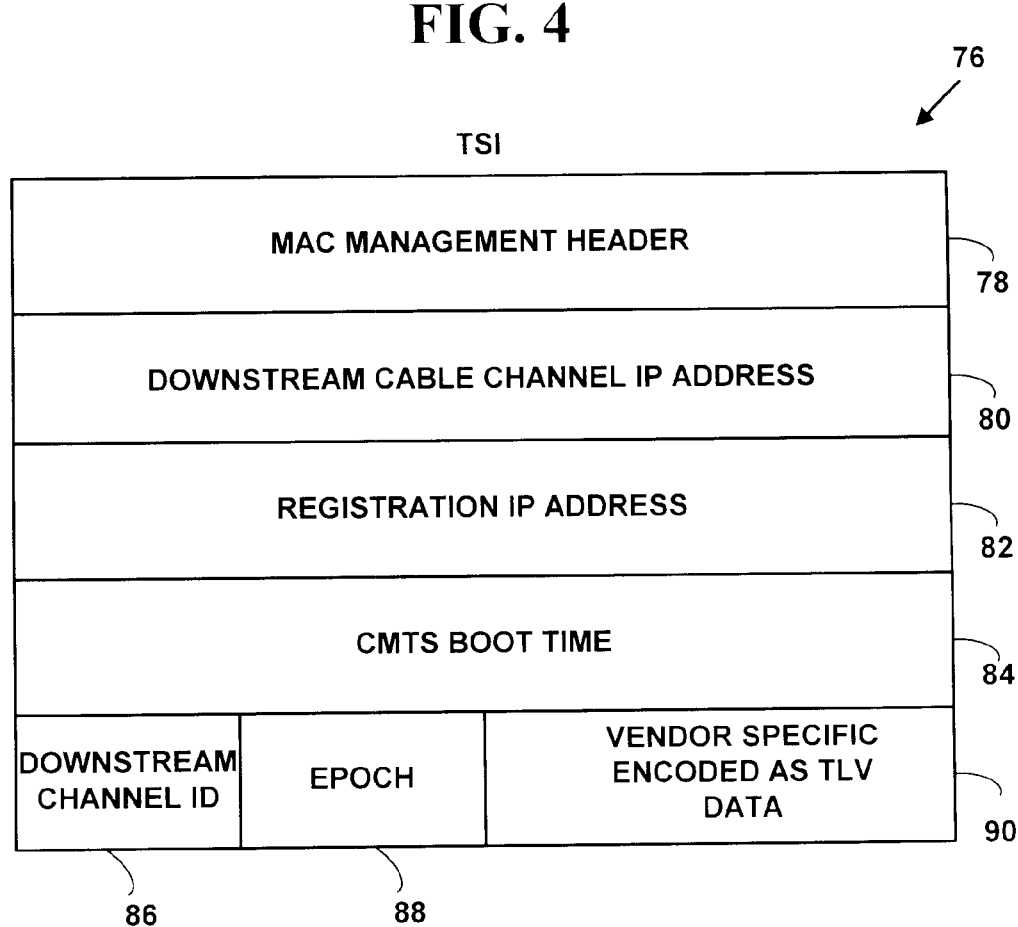
FIG. 4 is a block diagram illustrating a Termination System Information message structure.

FIG. 4 is a block diagram of a TSI message structure 76. The TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony return is being used, after receiving the TCD 70 message and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24. Once LCP negotiation is complete, the CM 16 requests Internet Protocol Control Protocol ("IPCP") address negotiation for an upstream telephony return path. For more information on IPCP see, RFC-1332, incorporated herein by reference. During IPCP negotiation, the CM 16 negotiates an IP 54 address with the TRAC 24 for sending IP 54 data packet responses back to data network 28 via the TRAC 24, via PPP 50.

When the CM 16 has established an upstream IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 must first determine an address of a host interface (e.g., an IP 54 interface) associated with on the CMTS 12 that can be used by data network 28 to send data to the CM 16. In one preferred embodiment of the present invention, the CM 16 has only a downstream cable connection from the CMTS 12 and will obtain a connection address to the data network 28 using an upstream telephony connection to the TRAC 24. In another preferred embodiment of the present invention, the CM 16 will obtain a connection address to the cable network using an upstream cable connection to the CMTS 12.

An exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12) and not use the PSTN 22, the TRAC 24, or the telephony return upstream path at all.

1. An IP 54 datagram from data network 28 destined for the CM 16 arrives on the CMTS-NSI 32 and enters the CMTS 12.
2. CMTS 12 encodes the IP 54 datagram in a cable data frame, passes it to MAC 44 and transmits it "downstream" to RF interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with telephony interface 48 via the PSTN 22 to TRAC 24.
5. TRAC 24 decodes the IP 54 datagram and forwards it via TRAC-NSI 30 to a destination on data network 28.

Dynamic Network Host Configuration on a Data-over-cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated DHCP 66 servers allocate network host addresses and deliver configuration parameters to dynamically configured network host clients.

Figure 5:
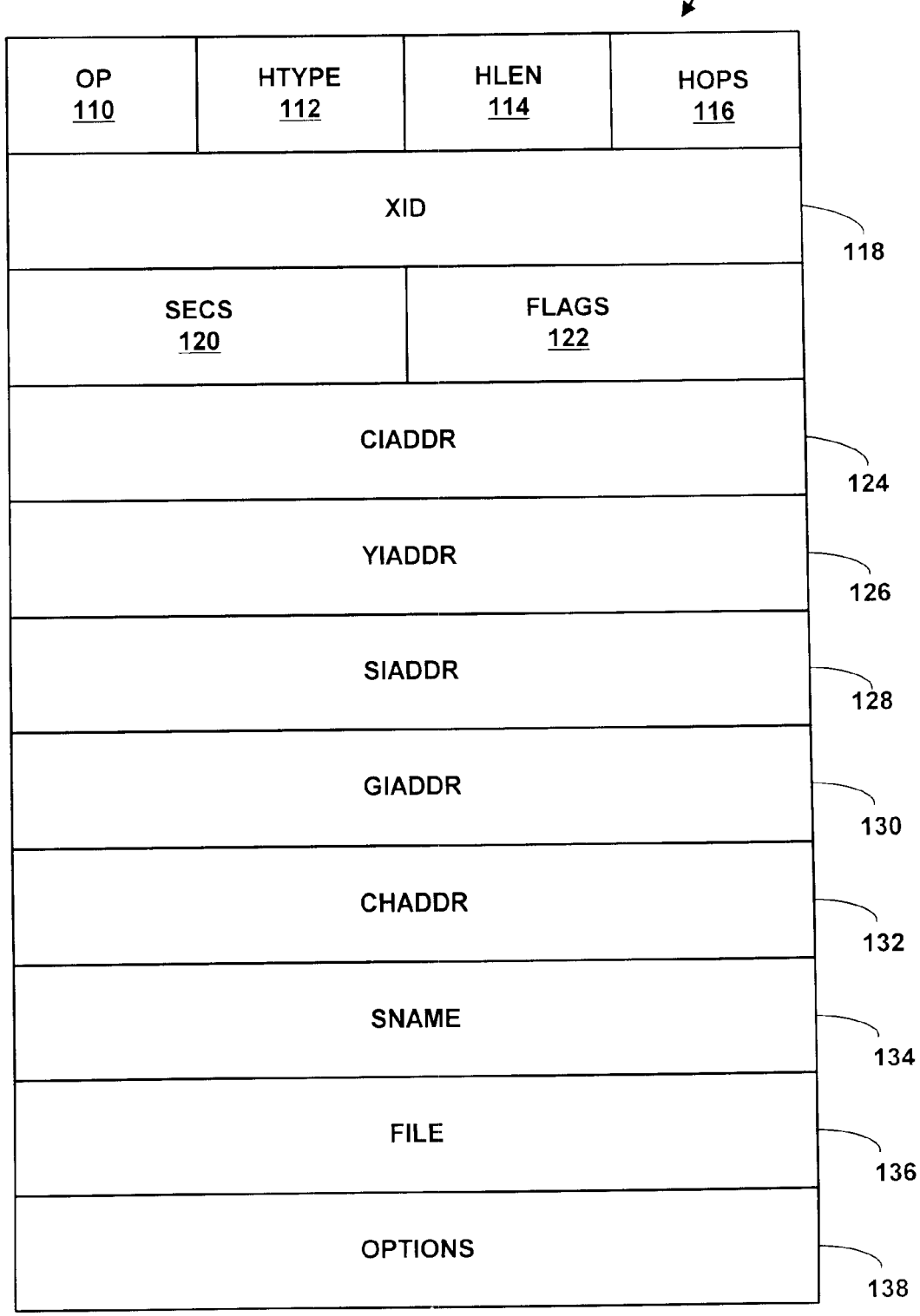
FIG. 5 is a block diagram illustrating a Dynamic Host Configuration Protocol message structure.

FIG. 5 is a block diagram illustrating an exemplary DHCP 66 message structure 108. The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host the clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 servers uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for an exemplary DHCP 66 message 108 fields are shown in Table 4.

TABLE 4

| DHCP 66 Parameter | Description |
| --- | --- |
| OP 110 | Message op code / message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your' (client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 5 is used to discover IP 54 and other network host interfaces in data-over-cable system 10. A network host client (e.g., the CM 16) uses the DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering Network Host Interfaces in the Data-over-cable System

The DHCP 66 discovery process illustrated in Table 5 will not work in data-over-cable system 10 with or without telephony return. In an exemplary preferred embodiment of the present invention with telephony return, the CM 16 discovers network host interfaces via TRAC 24 and the PSTN 22 on an upstream telephony connection. In another exemplary preferred embodiment of the present invention without telephony return, the CM 16 discovers network host interfaces via the CMTS 12 on an upstream cable connection.

The DHCP 66 addressing process shown in Table 5 was not originally intended to discover network host interfaces for a system like the data-over-cable system 10. The CMTS 12 has DHCP 66 servers associated with network host interfaces (e.g., IP 54 interfaces). However, in one preferred embodiment of the present invention with telephony return, the CM 16 only has as downstream connection from the CMTS 12. The CM 16 has an upstream connection to TRAC 24, which has a DHCP 66 layer. However, TRAC 24 does not have the DHCP 66 servers, or direct access to network host interfaces (e.g., IP 54 interfaces) associated with the CMTS 12.

FIGS. 6A and 6B are a flow diagram illustrating a Method 140 for discovering network host interfaces in data-over-cable system 10. In one preferred embodiment of the present inventions with telephony return, after the CM 16 has established an IP 54 link to TRAC 24, via PPP 50, it begins communications with the CMTS 12 via DHCP 66 to complete a virtual IP 54 connection with the data network 28. However, to discover what IP 54 host interfaces might be available on the CMTS 12, the CM 16 has to communicate with the CMTS 12 via an upstream telephony connection to the PSTN 22 and the TRAC 24 since the CM 16 only has a "downstream" cable channel from the CMTS 12 in a data-over-cable system with telephony return.

At Step 142 in FIG. 6A, after receiving a TSI message 76 from the CMTS 12 on a downstream cable connection, the CM 16 generates a DHCP discover ("DHCPDISCOVER") message and sends it upstream via an upstream telephony connection to the PSTN 22 and the TRAC 22 to discover what IP 54 interfaces are associated with the CMTS 12. The fields of the DHCP 66 discover message are set as illustrated in Table 6. However, other field settings may also be used.

TABLE 6

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP 54 address, the IP 54 address is placed in this field. If the CM 16 has previously been assigned an IP 54 address by the DHCP 66, and also has been assigned an address via IPCP, the CM 16 places the DHCP 66 IP 54 address in this field. |
| GIADDR 130 | CM 16 places the Downstream Channel IP 54 address 80 of the CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more network host interfaces (e.g., IP 54 host interfaces), associated with the CMTS 12. The DHCP 66 giaddr-field 130 (FIG. 5) includes a downstream channel IP address 80 of the CMTS 12 obtained in TSI message 76. Using the downstream channel IP address 80 of the CMTS 12 obtained in TSI message 76 allows the DHCPDISCOVER message to be forwarded by TRAC 24 to the DHCP 66 servers (i.e., protocol servers) associated with network host interfaces associated with the CMTS 12. If the DHCP 66 giaddr-field 130 (FIG. 5) in a DHCP message from a DHCP 66 client is non-zero, a DHCP 66 server sends any return messages to a DHCP 66 server port on a DHCP 66 relaying agent (e.g., the CMTS 12) whose address appears in the DHCP 66 giaddr-field 130.

In a typical DHCP 66 discovery process, the DHCP 66 giaddr-field 130 is set to zero. However, in one preferred embodiment of the present invention, the DHCP 66 giaddr-field 130 contains the IP address 80 of the CMTS 12. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124 (FIG. 5), or to a client's hardware address (e.g., MAC address 44) specified in the DHCP 66 chaddr-field 132 (FIG. 5) or to a local subnet broadcast address (e.g., 255.255.255.255). If the DHCP 66 giaddr-field 130 is non-zero, a relay agent is being used (e.g., the CMTS 12).

At Step 144, a DHCP 66 layer on TRAC 24 broadcasts the DHCPDISCOVER message on its local network leaving the DHCP 66 giaddr-field 130 intact since it already contains a non-zero value. TRAC's 24 local network includes connections to one or more DHCP 66 proxies (i.e., network host interface proxies). The DHCP 66 proxies accept the DHCP 66 messages originally from the CM 16 destined for DHCP 66 servers associated with network host interfaces associated with the CMTS 12. The TRAC 24 has no direct access to DHCP 66 servers associated with network host interfaces associated with the CMTS 12. The DHCP 66 proxies are not used in a typical the DHCP 66 discovery process known on the art.

One or more DHCP 66 proxies on TRAC's 24 local network recognizes the DHCPDISCOVER message and forwards it to one or more DHCP 66 servers associated with network host interfaces (e.g., IP 54 interfaces) associated with the CMTS 12 at Step 146. Since the DHCP 66 giaddr-field 130 (FIG. 5) in the DHCPDISCOVER message sent by the CM 16 is already non-zero (i.e., contains the downstream IP address of the CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., the CM 16) in response to a DHCPDISCOVER message. The DHCP 66 offer message is sent with the message fields set as illustrated in Table 7. However, other field settings can also be used. The DHCP 66 yiaddr-field 126 contains an IP 54 address for a network host interface available on the CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | IP 54 address from a network host interface to allow the CM 16 to receive data from data network 28 via a network host interface available on the CMTS 12. |
| SIADDR 128 | An IP 54 address for a TFTP 64 server to download configuration information for an interface host. |
| CHADDR 132 | MAC 44 address of the CM 16. |
| SNAME 134 | Optional DHCP 66 server identifier with an interface host. |
| FILE 136 | A TFTP 64 configuration file name for the CM 16. |

DHCP 66 servers send the DHCPOFFER message to the address specified in the DHCP 66 giaddr-field 130 (i.e., the CMTS 12) from the DHCPDISCOVER message if associated network host interfaces (e.g., IP 54 interfaces) can offer the requested service (e.g., IP 54 service) to the CM 16. The DHCPDISOVER message DHCP 66 giaddr-field 130 contains a downstream channel IP address 80 of the CMTS 12 that was received by the CM 16 in TSI message 76. This allows the CMTS 12 to receive the DHCPOFFER messages from the DHCP 66 servers and send them to the CM 16 via a downstream channel on cable network 14.

At Step 150 in FIG. 6B, the CMTS 12 receives one or more DHCPOFFER messages from one or more DHCP 66 servers associated with the network host interfaces (e.g., IP 54 interfaces). THE CMTS 12 examines the DHCP 66 yiaddr-field 126 and DHCP 66 chaddr-field 132 in the DHCPOFFER messages and sends the DHCPOFFER messages to the CM 16 via cable network 14 on a downstream cable channel. The DHCP 66 yiaddr-field 126 contains an IP 54 address for a network host IP 54 interface available on the CMTS 12 and used for receiving IP 54 data packets from data network 28. The DHCP 66 chaddr-field 132 contains the MAC 44 layer address for the CM 16 on a downstream cable channel from the CMTS 12 via cable network 14. The CMTS 12 "knows" the location of the CM 16 since it sent the CM 16 a MAC 44 layer address in one or more initialization messages (e.g., TSI message 76).

If a BROADCAST bit in flags-field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags-field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via cable network 14 on a downstream connection. At Step 154, the CM 16 selects an offer for IP 54 service from one of the network host interfaces (e.g., an IP interfaces 54) associated with the CMTS 12 that responded to the DHCPDISOVER message sent at Step 142 in FIG. 6A and establishes a virtual IP 54 connection. The selected DHCPOFFER message contains a network host interface address (e.g., IP 54 address) in the DHCP 66 yiaddr-field 126 (FIG. 5). A CM 16 acknowledges the selected network host interface with a DHCP 66 message sequence explained below.

After selecting and acknowledging a network host interface, the CM 16 has discovered an IP 54 interface address available on the CMTS 12 for completing a virtual IP 54 connection with the data network 28. Acknowledging a network host interface is explained below. The virtual IP 54 connection allows IP 54 data from the data network 28 to be sent to the CMTS 12 which forwards the IP 54 packets to the CM 16 on a downstream channel via the cable network 14. The CM 16 sends response IP 54 packets back to data network 28 via the PSTN 22 and the TRAC 24 if telephony return is used. The CM sends response IP packets back to the data network 28 via the CMTS 12 if a two-way cable network is used.

Figure 7:
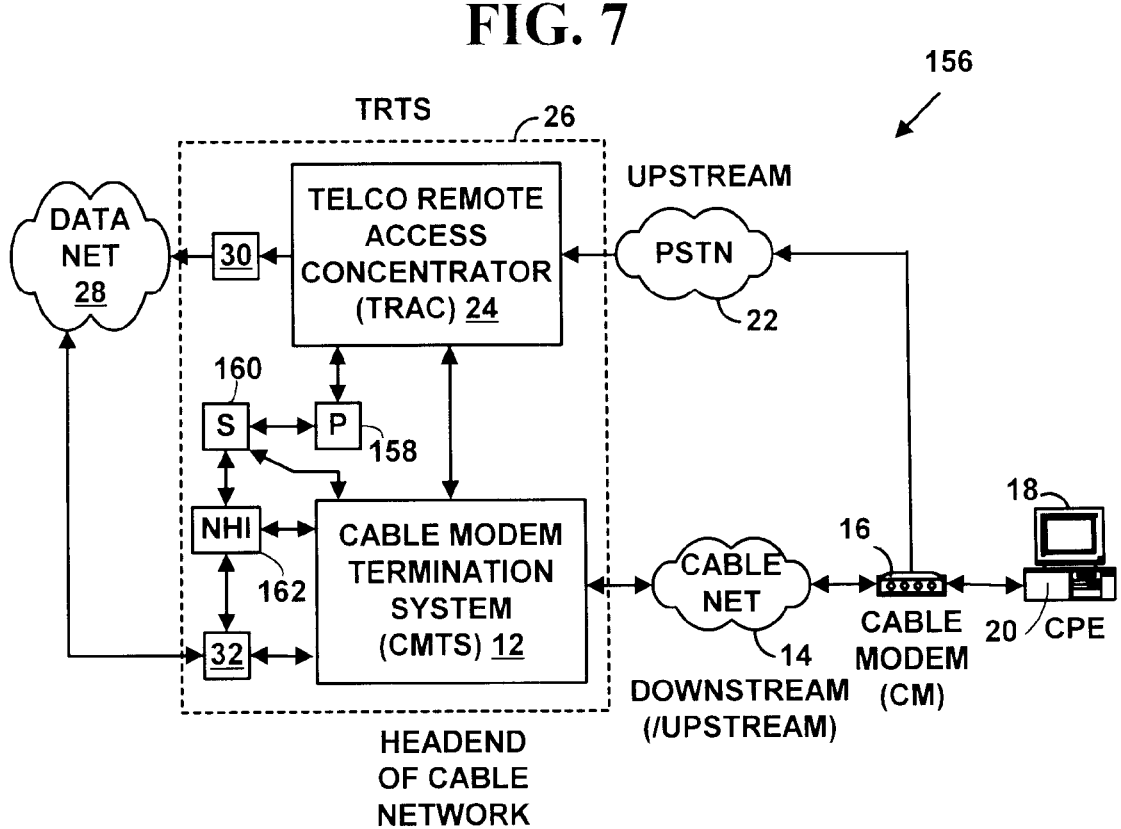
FIG. 7 is a block diagram illustrating a data-over-cable system for the method illustrated in FIGS. 6A and 6B.

FIG. 7 is a block diagram illustrating an exemplary data-over-cable system 156 for the Method illustrated in FIGS. 6A and 6B. Data-over-cable system 156 includes DHCP 66 proxies ("P") 158, DHCP 66 servers ("S") 160 and associated Network Host Interfaces ("NHI") 162 (e.g., IP 54 interfaces), available on the CMTS 12. Multiple DHCP 66 proxies 158, DHCP 66 servers 160 and network host interfaces 162 are illustrated as single boxes in FIG. 7. FIG. 7 also illustrates the DHCP 66 proxies 158 separate from TRAC 24. In one embodiment of the present invention, the TRAC 24 includes integral DHCP 66 proxy functionality and no separate DHCP 66 proxies 158 are used. In such an embodiment, TRAC 24 forwards the DHCP 66 messages using the DHCP 66 giaddr-field 130 to the DHCP 66 servers 160 associated with the CMTS 12.

FIG. 8 is a block diagram illustrating a message flow 162 of Method 140 (FIGS. 6A and 6B). Message flow 162 includes the DHCP proxies 158 and the DHCP servers 160 illustrated in FIGS. 6A and 6B. Steps 142, 144, 146, 148, 150 and 154 of Method 140 (FIGS. 6A and 6B) are illustrated in FIG. 8. In one embodiment of the present invention, the DHCP proxies 158 are not separate entities, but are included in TRAC 24. In such an embodiment, the DHCP proxy services are provided directly by TRAC 24.

Resolving Addresses for Network Host Interfaces

Since the CM 16 receives multiple the DHCPOFFER messages (Step 152 FIG. 6B) the CM 16 resolves and acknowledges one offer from a selected network host interface. FIGS. 9A and 9B are a flow diagram illustrating a Method 188 for resolving discovered host addresses in data-over-cable system 10 with telephony return.

At Step 190 in FIG. 9A, the CM 16 receives one or more DHCPOFFER messages from one or more of the DHCP 66 servers 160 associated with one or more network host interfaces 162 (e.g., IP 54 interfaces) associated with the CMTS 12. The one or more DHCPOFFER messages include the DHCP 66 fields set as illustrated in Table 7 above. However, other field settings could also be used. At Step 192, the CM 16 selects one of the DHCPOFFER messages. At Step 194, the CM 16 creates a DHCP 66 request message ("DHCPREQUEST") message to request the services offered by a network host interface 168 selected at Step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP address, the IP address is placed in this field. If the CM 16 has previously been assigned an IP address by the DHCP 66, and also has been assigned an address via IPCP, the CM 16 places the DHCP 66 IP 54 address in this field. |
| YIADDR 126 | IP 54 address sent from the selected network interface host in DHCPOFFER message |
| GIADDR 130 | CM 16 places the Downstream Channel IP 54 address 80 the CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface 162 associated with the CMTS 12 using a DHCP 66 server 160 associated with the selected network host interface 162. The DHCP 66 giaddr-field 130 (FIG. 5) includes the downstream channel IP address 80 for the CMTS 12 obtained in TSI message 76. Putting the downstream channel IP address 80 obtained in TSI message 76 in a DHCPREQUEST message allows the DHCPREQUEST message to be forwarded by the TRAC 24 to the DHCP 66 servers 160 associated with network host interfaces 162 associated with the CMTS 12. The DHCP 66 giaddr-field 126 contains an identifier and the DHCP 66 sname-field 134 contains a DHCP 66 server identifier 160 associated with the selected network host interface.

If the DHCP 66 giaddr-field 130 in a DHCP 66 message from a DHCP 66 client is non-zero, a DHCP 66 server 160 sends any return messages to a DHCP 66 server port on a DHCP 66 relaying agent (e.g., the CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 9A at Step 196, the CM 16 sends the DHCPREQUEST message on the upstream telephony connection to TRAC 24 via the PSTN 22. At Step 198, a DHCP 66 layer on TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept DHCP 66 messages originally from the CM 16 destined for the DHCP 66 servers 160 associated with network host interfaces 168 associated with the CMTS 12. In another embodiment of the present invention, TRAC 24 provides the DHCP 66 proxy functionality, and no separate DHCP 66 proxies are used.

The one or more DHCP 66 proxies 158 on TRAC's 24 local network message forwards the DHCPOFFER to one or more of the DHCP 66 servers 160 associated with network host interfaces 162 (e.g., IP 54 interfaces) available on the CMTS 12 at Step 200 in FIG. 9B. Since DHCP 66 giaddr-field 130 in the DHCPDISCOVER message sent by the CM 16 is already non-zero (i.e., contains the downstream IP address of the CMTS 12), the DHCP 66 proxies leave 158 the DHCP 66 giaddr-field 130 intact.

One or more of the DHCP 66 servers 160 for the selected network host interfaces 162 (e.g., IP 54 interface) associated with the CMTS 12 receives the DHCPOFFER message at Step 202. A selected DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message as being for the selected DHCP 66 server 160.

The selected DHCP 66 server 160 associated with network host interface 162 selected by the CM 16 in the DHCPREQUEST message creates and sends a DHCP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow the CM 16 to receive data from data network 28. |
| SIADDR 128 | An IP 54 address for a TFTP 64 server to download configuration information for an interface host. |
| CHADDR 132 | MAC 44 address of the CM 16. |
| SNAME 134 | DHCP 66 server identifier associated with the selected network host interface. |
| FILE 136 | A configuration file name for an network interface host. |

The selected DHCP 66 server 160 sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server 160 associated with the selected network host interface 162 IP 54 address (e.g., IP 54 interface). The CMTS 12 examines the DHCP 66 yiaddr-field 126 and the DHCP 66 chaddr-field 132 in the DHCPACK message. The DHCP 66 yiaddr-field 126 contains an IP 54 address for a network host IP 54 interface available on the CMTS 12 and used for receiving IP 54 data packets from data network 28 for the CM 16. The DHCP 66 chaddr-field 132 contains the MAC 44 layer address for the CM 16 on a downstream cable channel from the CMTS 12 via cable network 14.

CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12, to forward any datagrams from a data network such as data network 28 it receives for hosts such as the CM 16. For more information on ARP see, RFC-826, incorporated herein by reference.

CMTS 12 stores a pair of network address values in the ARP table, the IP 54 address of the selected network host interface from the DHCP 66 yiaddr-field 126 and a Network Point of Attachment ("NPA") address. In one preferred embodiment of the present invention, The NPA address is a MAC 44 layer address for the CM 16 via a downstream cable channel. The IP/NPA address pair are stored in local routing tables with the IP/NPA addresses of hosts (e.g., the CMs 16) that are attached to cable network 14.

At Step 210, the CMTS 12 sends the DHCPACK message to the CM 16 via the cable network 14. At Step 212, the CM 16 receives the DHCPACK message, and along with the CMTS 12 has addresses for a "virtual connection" between the data network 28 and the CM 16. When data packets arrive on the IP 54 address for the selected CM 16 they are sent to the CMTS 12 and the CMTS 12 forwards them using a NPA (i.e., a MAC 44 address) from the routing tables on a downstream channel via the cable network 14 to the CM 16.

If a BROADCAST bit in the DHCP 66 flags-field 124 is set to one in the DHCPACK, the CMTS 12 sends the DHCPACK messages to a broadcast IP 54 address (e.g., 255.255.255.255). The DHCP 66 chaddr-field 132 is still used to determine a MAC 44 layer address. If the BROADCAST bit in the DHCP 66 flags field 122 is set, the CMTS 12 does not update the ARP table or other routing tables based upon the DHCP 66 yiaddr-field 126 and the DHCP 66 chaddr-field 132 pair when a broadcast message is sent.

Figure 10:
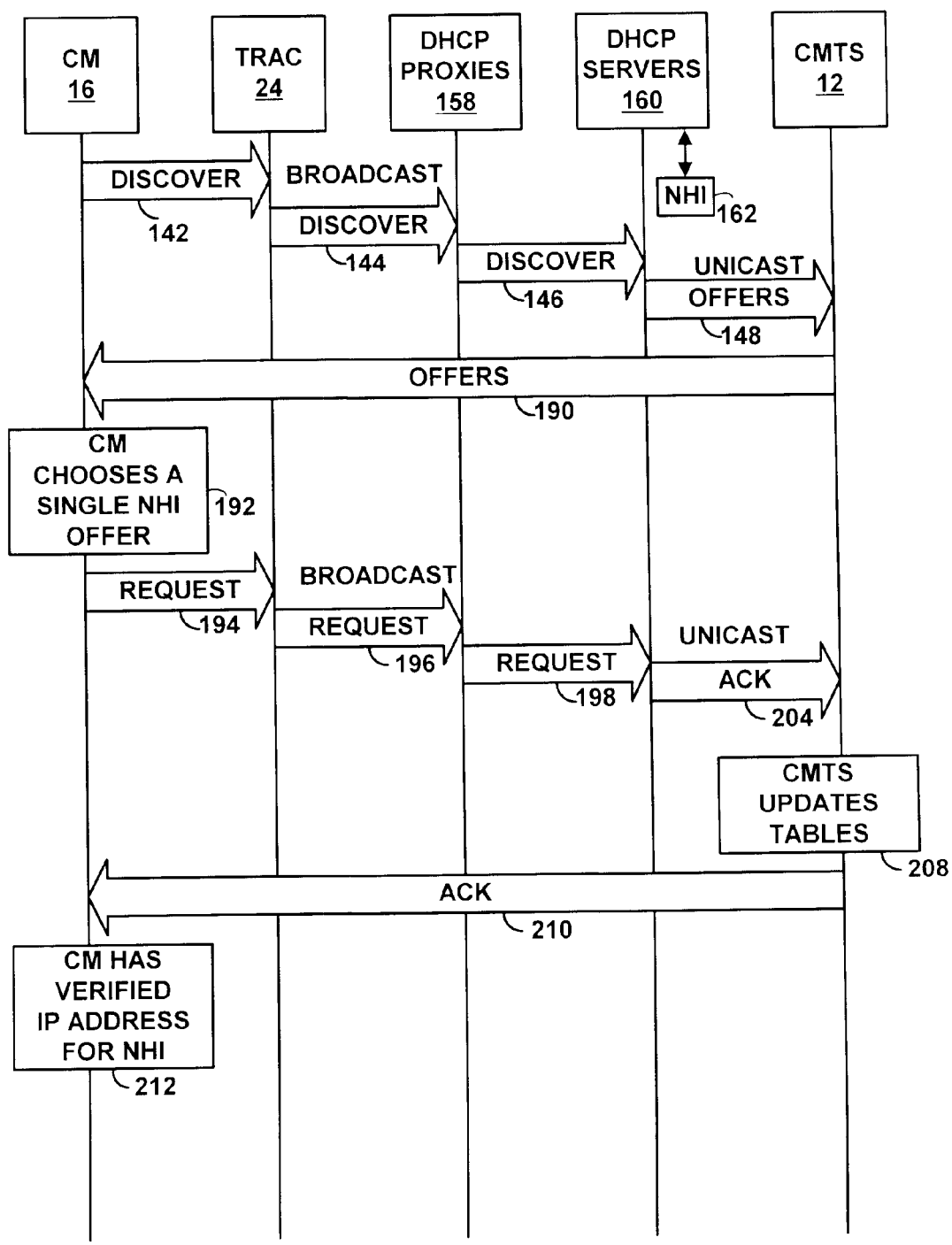
FIG. 10 is a block diagram illustrating the message flow of the method illustrated in FIG. 10.

FIG. 10 is a block diagram illustrating the message flow 214 of the Method 188 illustrated in FIGS. 9A and 9B. Message flow 214 includes the DHCP proxies 158 and the DHCP servers 160 illustrated in FIG. 7. Method Steps 194, 196, 198, 204, 208, 210 and 212 of Method 188 (FIGS. 9A and 9B) are illustrated in FIG. 10. In one embodiment of the present invention, the DHCP proxies 158 are not separate entities, but are included in TRAC 24. In such an embodiment, the DHCP proxy services are provided directly by TRAC 24.

After Method 188, the CMTS 12 has a valid IP/MAC address pair in one or more address routing tables including an ARP table to forward IP 54 data packets from data network 28 to the CM 16, thereby creating a virtual IP 54 data path to/from the CM 16 as was illustrated in and Table 3. The CM 16 has necessary parameters to proceed to the next phase of initialization, a downloading of a configuration file via TFTP 64. Once the CM 16 has received the configuration file and has been initialized, it registers with the CMTS 12 with a registration message and is ready to receive data from data network 14.

In the event that the CM 16 is not compatible with the configuration of the network host interface 162 received in the DHCPACK message, the CM 16 may generate a DHCP 66 decline message ("DHCPDECLINE") and transmit it to TRAC 24 via the PSTN 22. A DHCP 66 layer in TRAC 24 forwards the DHCPDECLINE message to the DHCP servers 160 and the CMTS 12. Upon seeing a DHCPDECLINE message, the CMTS 12 flushes its ARP tables and routing tables to remove the now invalid IP/MAC pairing. The CM 16 may also send the DHCPDECLINE message to the CMTS 12 on an upstream cable connection. The CMTS 12 will then forward the DHCPDECLINE message to the appropriate DHCP 66 server 160. If an IP 54 address for a network host interface is returned in a DHCPACK that is different from the IP 54 address sent by the CM 16 in the DCHCPREQUEST message, the CM 16 uses the IP 54 address it receives in the DHCPACK message as the IP 54 address of the selected network host interface for receiving data from data network 28.

One preferred embodiment of the present invention is described with respect to, but is not limited to a data-over-cable-system with telephony return. Method 142 and Method 188 can also be used with a cable modem that has a two-way connection (i.e., upstream and downstream) to the cable network 14 and the CMTS 12. In a data-over-cable-system without telephony return, the CM 16 would broadcast the DHCPREQUEST message to one or more DHCP 66 servers 160 associated with one or more network host interfaces 162 associated with the CMTS 12 using an upstream cable connection on the data network 14 including the IP 54 address of the CMTS 12 in the DHCP 66 giaddr-field 130. In such an embodiment, the upstream telephony connection, the PSTN 22, the TRAC 24 and the DHCP 66 proxies 158, ate not used. If an upstream cable connection is used instead of an upstream telephony return channel, method steps in Methods 142 and 188 associated with the PSTN 22, the TRAC 24 and the DHCP proxies are skipped. Method 188 accomplishes resolving addresses for network interface hosts from a cable modem in a data-over-cable with or without telephony return, and without extensions to the existing DHCP protocol.

CPE Initialization in a Data-over-cable System

The CPE 18 also uses the DHCP 66 to generate requests to obtain IP 54 addresses to allow CPE 18 to also receive data from data network 28 via the CM 16. In a preferred embodiment of the present invention, the CM 16 functions as a standard BOOTP relay agent/DHCP Proxy 158 to facilitate CPE's 18 access to the DHCP 66 server 160

Figure 11A:
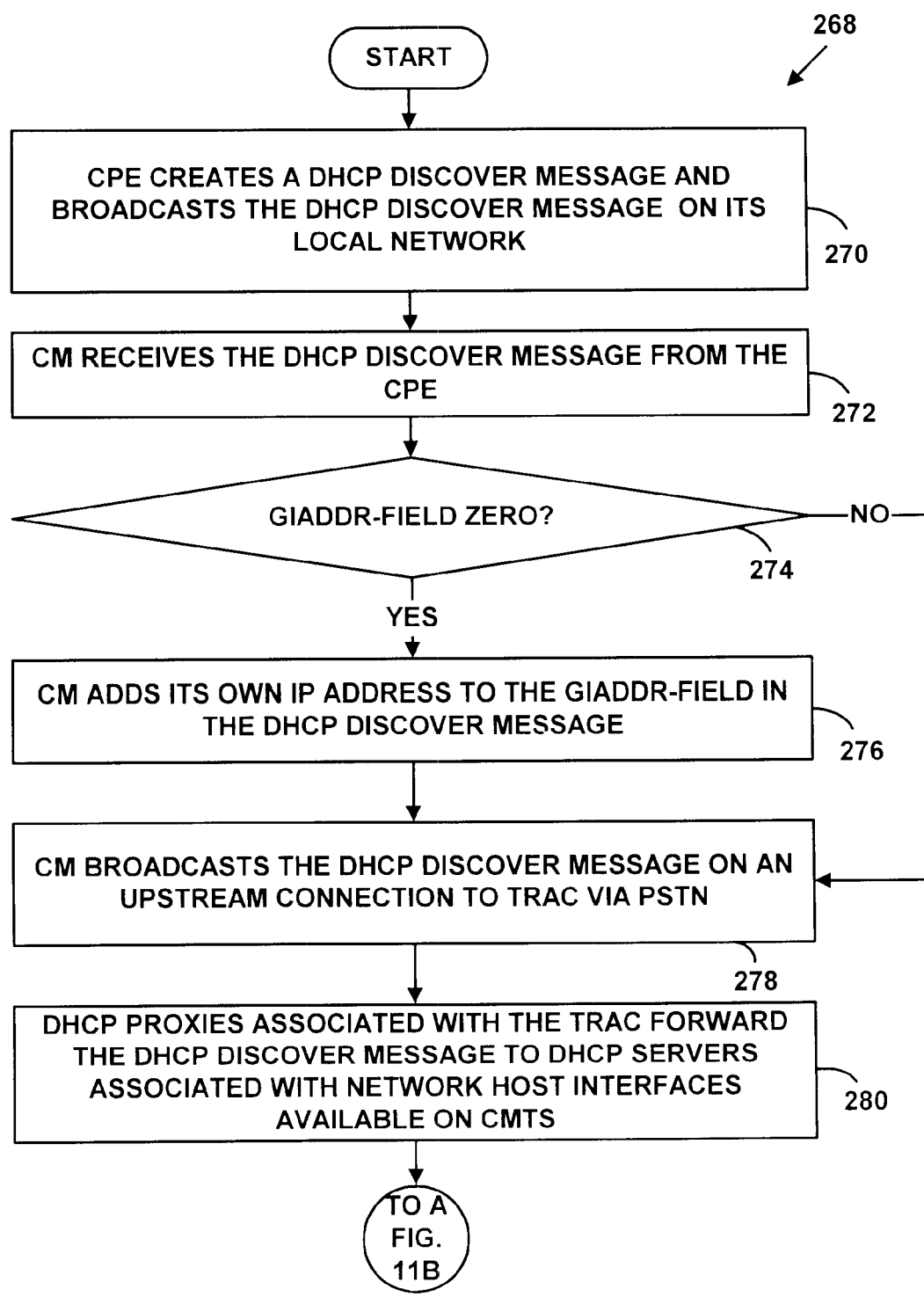

FIGS. 11A and 11B are a flow diagram illustrating a Method 268 for addressing network host interfaces 162 from CPE 18. At Step 270 in FIG. 11A, the CPE 18 generates a DHCPDISCOVER message broadcasts the DHCPDISCOVER message on its local network with the fields set as illustrated in Table 6 above with addresses for CPE 18 instead of the CM 16. However, more or fewer field could also be set in the DHCPDISCOVER message. The CM 16 receives the DHCPDISCOVER as a standard BOOTP relay agent at Step 272. The DHCPDISCOVER message has a MAC 44 layer address for the CPE 18 in the DHCP 66 chaddr-field 132, which the CM 16 stores in one or more routing tables (e.g., ARP tables). As a BOOTP relay agent, the CM 16 checks the DHCP 66 giaddr-field 130 (FIG. 5) at Step 274. If the DHCP 66 giaddr-field 130 is set to zero, the CM 16 put its own IP 54 address into the DHCP 66 giaddr-field 130 at Step 276, including the CM 16 is a relay agent.

If the DHCP 66 giaddr-field 130 is non-zero, the CM 16 does not alter the DHCP 66 giaddr-field 130 since there could be another BOOTP relay agent attached to CPE 18 which may have already set the DHCP 66 giaddr-field 130. A BOOTP relay agent attached to CPE 18 would have also have acquired its IP 54 address using a DHCP 66 discovery process similar to the one described above (e.g., FIG. 10).

Returning to FIG. 11A, at Step 278, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 280, one or more DHCP 66 proxies 158 associated with TRAC 24, recognize the DHCPDISOVER message, and forward it to one or more DHCP 66 servers 160 associated with one or more network host interfaces 162 associated with the CMTS 12. Since the DHCP 66 giaddr-field 130 is already non-zero, the DHCP proxies 160 leave the DHCP 66 giaddr-field 130 intact. In another embodiment of the present invention, TRAC 24 includes DHCP 66 proxy 158 functionality and no separate DHCP 66 proxies 158 are used. In yet another embodiment of the present invention, the CM 16 broadcasts the DHCPDISCOVER message to the CMTS 12 on an upstream cable connection. The CMTS 12 forwards the DHCPDISCOVER message to one or more DHCP servers 160.

At Step 282 in FIG. 11B, the one or more DHCP servers 160 receive the DHCPDISCOVER message from one or more DHCP proxies 158 and generate one or more DHCPOFFER messages to offer connection services for one or more network host interfaces 162 associated with the CMTS 12 with fields set as illustrated in Table 7. The one or more DHCP 66 servers 160 send the one or more DHCPOFFER messages to the address specified in the DHCP 66 giaddr-field 130 (e.g., the CM 16 or a BOOTP relay agent associated with CPE 18), which is an IP 54 address already contained in an ARP or other routing table in the CMTS 12. Since the CMTS 12 also functions as a relay agent for the one or more DHCP servers 160, the one or more DHCPOFFER messages are received on the CMTS 12 at Step 284.

The CMTS 12 examines the DHCP 66 yiaddr-field 126 and the DHCP 66 giaddr-field 130 in the DHCPOFFER messages, and sends the DHCPOFFER messages down cable network 14 to IP 54 address specified in the DHCP 66 giaddr-field 130. The MAC 44 address for the CM 16 is obtained through a look-up of the hardware address associated with the DHCP 66 chaddr-field 130 (e.g., using ARP). If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. The CMTS 12 does not update its ARP or other routing tables based upon the broadcast DHCP 66 yiaddr-field 126 DHCP 66 chaddr-field 132 address pair.

Returning to FIG. 11B, the CM 16 receives the one or more DHCPOFFER messages and forwards them to CPE 18 at Step 286. The CM 16 uses the MAC 44 address specified by the DHCP 66 chaddr-field 132 look-up in its routing tables (e.g., an ARP table) to find the address of CPE 18 even if the BROADCAST bit in the DHCP 66 flags-field 122 is set. At Step 290, the CPE 18 receives the one or more DHCPOFFER messages from the CM 16. At Step 292, CPE the 18 selects one of the DHCPOFFER messages to allow a virtual connection to be established between the data network 28 and the CPE 18. Method 266 accomplishes addressing network interface hosts from CPE 18 in data-over-cable system 10 without extensions to the existing DHCP 66 protocol.

Figure 12B:
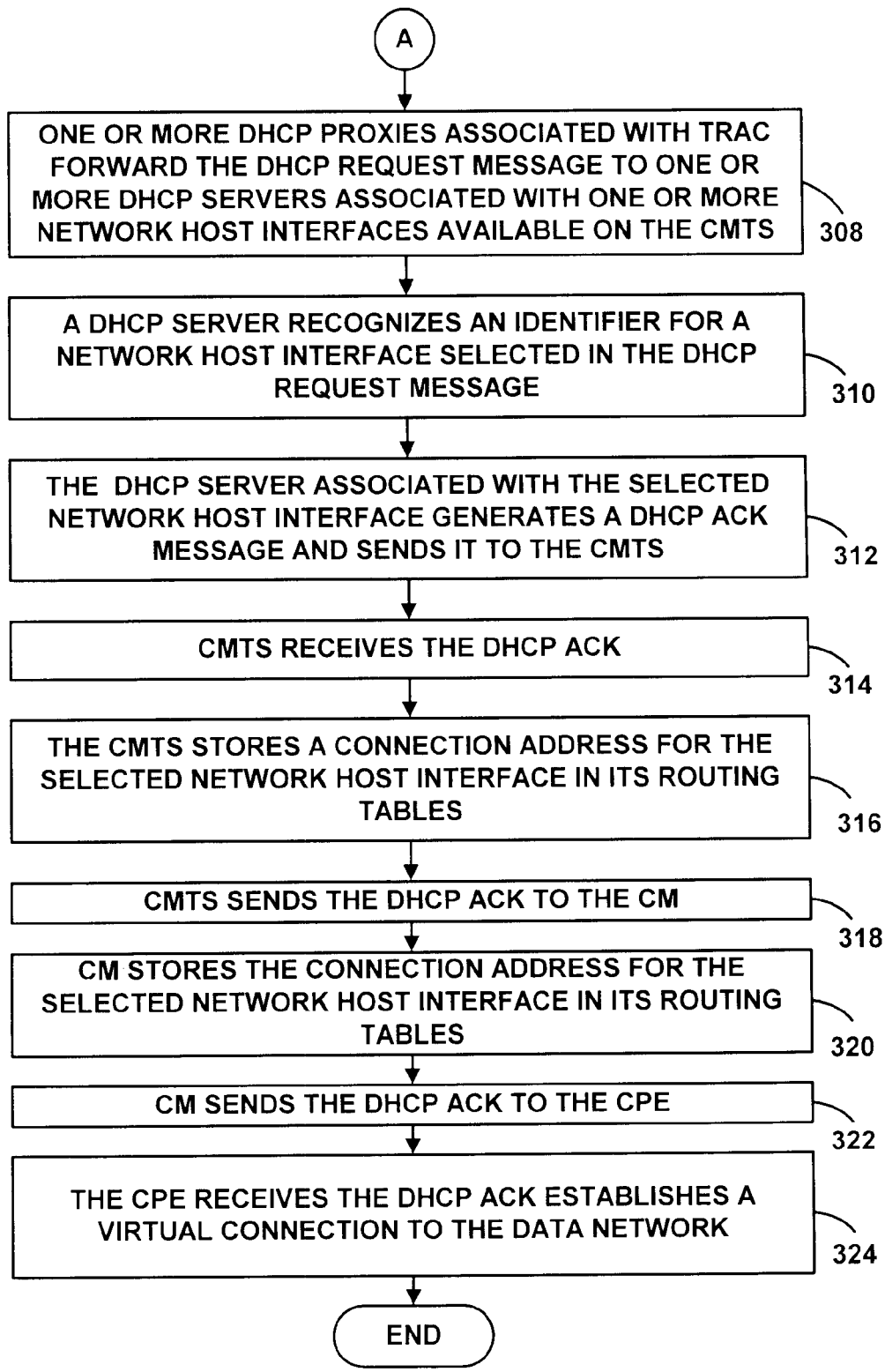

FIGS. 12A and 12B are a flow diagram illustrating a Method 294 for resolving network host interfaces from the CPE 18. At Step 296 of FIG. 12A, the CPE 18 receives the one or more DHCPOFFER messages from the one or more DHCP 66 servers 160 associated with the one or more network host interfaces associated with the CMTS 12. At Step 298, the CPE 18 chooses one offer of services from a selected network host interface 162. At Step 300, the CPE 18 generates a DHCPREQUEST message with fields set as illustrated in Table 8 above with addresses for CPE 18 instead of the CM 16. However, more or fewer fields could also be set. At Step 302, CPE 18 sends the DHCPREQUEST message to the CM 16. At Step 304, the CM 16 forwards the message to TRAC 24 via the PSTN 22 (or to the CMTS 12 via an upstream cable connection if a two-way cable system is being used).

At Step 306, a DHCP proxies 158 associated with the TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept the DHCP 66 messages originally from the CPE 18 destined for the DHCP 66 servers 160 associated with network host interfaces 162 associated with the CMTS 12. In another embodiment of the present invention, TRAC 24 provides the DHCP 66 proxy functionality, and no separate DHCP 66 proxies 158 are used.

One or more DHCP 66 proxies 158 on TRAC's 24 local network recognize the DHCPOFFER message and forward it to one or more of the DHCP 66 servers 160 associated with network host interfaces 162 (e.g., IP 54 interfaces) associated with the on the CMTS 12 at Step 308 in FIG. 12B. Since the DHCP 66 giaddr-field 130 in the DHCPDISCOVER message sent by the CPE 18 is already non-zero, (i.e., set by the CM 16) the DHCP 66 proxies leave the DHCP 66 giaddr-field 130 intact.

One or more DHCP 66 servers 160 for the selected network host interfaces 162 (e.g., IP 54 interface) associated with the CMTS 12 receive the DHCPOFFER message at Step 310. A selected the DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message for the selected the DHCP 66 server 160.

The selected DHCP 66 server 160 associated with network host interface 162 selected by the CPE 18 in the DHCPREQUEST message creates and sends a DHCP 66 acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface 162 available on the CMTS 12 for receiving data packets from data network 28 for CPE 18.

At Step 314, the CMTS 12 receives the DHCPACK message. the CMTS 12 examines the DHCP 66 giaddr-field 130 and looks up that IP 54 address in its ARP table or other routing tables for an associated MAC 44 address. This is a MAC 44 address for the CM 16, which sent the DHCPREQUEST message from CPE 18. The CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. the CMTS 12 uses the MAC 44 address associated with the DHCP 66 chaddr-field 130 even if the BROADCAST bit is set.

The CM 16 receives the DHCPACK message. The CM 16 examines the DHCP 66 yiaddr-field 126 and DHCP 66 chaddr-field 132, and updates its routing table and ARP tables to reflect the address pairing at Step 320. At Step 322, the CM 16 sends the DHCPACK message to CPE 18 via the CMCI 20 at the IP 54 and the MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. The CM 16 uses the MAC 44 address specified in the DHCP 66 chaddr-field 132 even if the BROADCAST bit is set to locate the CPE 18. At Step 324, CPE 18 receives the DHCPACK from the CM 16 and has established a virtual connection to data network 28.

In the event that the CPE 18 is not compatible with the configuration received in the DHCPACK message, the CPE 18 may also generate a DHCP 66 decline ("DHCPDECLINE") message and send it to the CM 16. The CM 16 will transmit the DHCPDECLINE message up the PPP 50 link via the PSTN 22 to TRAC 24 or the CMTS 12 via an upstream cable connection. On seeing a DHCPDECLINE message the TRAC 24 sends a unicast copy of the message to the CMTS 12. the CM 16 and the CMTS 12 examine the DHCP 66 yiaddr-field 126 and the DHCP 66 giaddr-field 130, and update their routing and ARP tables had routing tables to flush any invalid pairings.

Upon completion of Methods 266 and 292, the CM 16 and the CMTS 12 have valid IP/MAC address pairings in their routing and ARP tables. These tables store the same set of IP 54 addresses, but does not associate them with the same MAC 44 addresses. This is because the CMTS 12 resolves all the CPE 18 IP 54 addresses to a MAC 44 address of a corresponding the CM 16. The CMs 16, on other hand, is able to address the respective MAC 44 addresses of their own CPEs 18. This also allows the DHCP 66 clients associated with the CPE 18 to function normally since the addressing that is done in the CM 16 CM 16 and the CMTS 12 is transparent to CPE 18 hosts.

FIG. 13 is a block diagram illustrating a message flow 326 for Methods 268 and 294 in FIGS. 11A, 11B, and 12A and 12B. Message flow 326 illustrates a message flow for Methods 268 and 294, for a data-over-cable system with and without telephony return. In another embodiment of the present invention, the CM 16 forwards requests from CPE 18 via an upstream cable connection on cable network 14 to the DHCP servers 160 associated with one or more network host interfaces 162 associated with the CMTS 12. In such an embodiment, upstream telephony return channel, the PSTN 22, the TRAC 24 and the DHCP proxies 158 are not used.

Method 268 and 294 accomplishes resolving addresses for network interface hosts from customer premise equipment in a data-over-cable with or without telephony return without extensions to the existing DHCP protocol. Methods 268 and 294 of the present invention are illustrated in data-over-cable system 10 with telephony return. However, the present invention is not limited to data-over-cable system 10 with telephony return and can be used in data-over-cable system 10 without telephony return by using an upstream cable connection instead of an upstream telephony connection and skipping method steps from Methods 268 and 294 associated with the PSTN 22, the TAC 24 and the DHCP 66 proxies 158.

Completing Initialization of a Cable Modem or CPE

After obtaining an IP 54 address via DHCP 66, the CM 16 receives a configuration file from a configuration file server. Information about the configuration file is included in the DHCPACK message (e.g., Table 9). For example, in one preferred embodiment of the present invention, a network address (e.g., an IP 54 address) for the server is included in a DHCP 66 siaddr-field 128 (FIG. 5), and a name of the configuration file in a DHCP 66 file-field 136. The as configuration file includes multiple configuration parameters used to initialize the CM 16. The TFTP 64 server obtains the requested configuration file and sends it to the CM 16. In one embodiment of the present invention, the configuration file is obtained by the TFTP 64 server from the DHCP server 160. In another embodiment of the present invention, the configuration file is obtained by the TFTP 64 server from the CMTS 12.

Configuration information from an exemplary configuration file is illustrated in Type/Length/Value ("TLV") format in Table 10. However, more or fewer configuration parameters could also be used. In addition, only an exemplary description of the Value in the TLV format is included since the actual numbers used for the Value fields are implementation specific.

TABLE 10

| Type | Length | Value | Notes |
|---|---|---|---|
| 4x | 6 | Variable | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| 8x | 8 | Variable | Vendor ID |
| 83 | N | Variable | N-bytes of vendor specific data in TLV format |
| 0 | N | N-byte padding | Padding to make message 4-byte aligned |
| 255 | N/A | | End-of-file |

The CPE 18 may also receive a configuration file, if necessary from the CM 16, the CMTS 12, or the DHCP server 160 via the TFTP 64 server. The CPE 18 also receives information on where to find a configuration file, if necessary, in a DCHPACK message. However, the CPE 18 may also receive information on where to find a configuration file with other messages (e.g., MAC 44) from the CM 16 or the CMTS 12.

After receiving a configuration file, the CM 16 sends a registration message to the CMTS 12. The registration message is typically a MAC 44 management message that includes a MAC 44 management header and selected information from the configuration file (e.g., from Table 10) in TLV format. The registration message is sent within a pre-determined time after receiving a DHCPACK to provide a security measure to protect the data-over-cable system 10. If the registration message is not sent to the CMTS 12 within the pre-determined time, the CMTS 12 purges its ARP and routing tables of entries including the IP 54 address obtained by the CM 16 with DHCP 66. This helps prevent a rogue CM 16 from registering with the CMTS 12.

If a data-over-cable system with telephony return is being used, the registration message is sent on an upstream telephony connection with PPP 50 via the PSTN 22 and TRAC 24 to the CMTS 12. If a data-over-cable system without telephony return is being used, the registration message is sent on an upstream cable connection to the CMTS 12.

Upon receiving the registration message from the CM 16, the CMTS 12 updates its routing and ARP tables to reflect a CM 16 IP 54/MAC 44 address pairing in the registration message. The CMTS 12 will generate an SNMP 62 trap if an IP 54 address in the registration message is paired with a different MAC 44 address for the CM 16 in the CMTS 12 tables. As is known in the art, an SNMP 62 trap is used to indicate an error condition in a network. As was discussed above, the CMTS 12 records an IP 54 address obtained by the CM 16 with DHCP 66 before it forwards the DHCPACK to the CM 16.

The CMTS 12 sends a registration response back to the CM 16 that also includes CPE 18 IP 54 addresses in the CMTS 12 routing and ARP tables which are associated with a MAC 44 address for the CM 16, if any. However, the CPE 18 may not have obtained an IP 54 address with DHCP 66 yet. The registration response message is also typically a MAC 44 management message with MAC 44 management header and TLV encoded data for the CM 16 (e.g., CMTS 12 data or vendor specific data).

The CM 16 may also proxy ARP for any CPE 18 IP 54 addresses in a registration response message. The CM 16 will use ARP on the CMCI 20 (FIG. 1) for the hardware addresses of the CPE 18 IP 54 addresses and update routing and ARP tables on the CM 16.

The CPE 18 may also send a registration message to the CMTS 12 via the CM 16, and may also receive a registration response from the CMTS 12 via the CM 16. If the CPE 18 sends a registration message, both the CM 16 and the CMTS 12 update ARP and other routing tables. The CMTS 12 will update its routing and ARP tables to reflect a CPE 18 IP 54 addresses and the CM 16 MAC 44 address pairing in the registration request. As was discussed above, the CMTS 12 records an IP 54 address obtained by the CPE 18 with DHCP 66 before sending a DHCPACK for the CPE 18 to the relay agent, the CM 16. The CMTS 12 will also generate an SNMP 64 trap if a CPE 18 IP 54 address in the registration request is paired with a different MAC 44 address for the CM 16 in the CMTS 12 tables.

If a data-over-cable system without telephony returned is being used, the CM 16 sends messages to the CMTS 12 on an upstream cable connection and receives messages from the CMTS 12 on a downstream cable channel. The CM 16 can also send data packets on an upstream cable connection to the CMTS 12, which forwards the data packets to the data network 28 via the CMTS-NSI 32. The CMTS 12 sends response data packets back to the CM 16 on a downstream cable channel.

If a data-over-cable system with telephony return is used, the CM 16 can send messages to the CMTS 12 on an upstream telephony connection via the PSTN 22 to the TRAC 24, which forwards the messages to the CMTS 12. The CM 16 can also send data packets on an upstream telephony connection via the PSTN 22 to the TRAC 24, which forwards the data packets to the data network 28. The CMTS 12 sends response data packets back to the CM 16 on a downstream cable channel.

After completing the registration request and registration response sequence, the CM 16 and/or the CPE 18 have completed initialization and can communicate with the data-over-cable system 10 and the data network 28 (FIG. 1). The CM 16 typically acts as a relay agent for requests and responses for one or more CPEs 18 attached to the CM 16.

Virtual Network Administration in a Data-over-cable System

Network addresses, such as IP 54 addresses, assigned to network devices, such as the CM 16, are typically assigned by a data-over-cable system 10, using DHCP 66 as was described above (e.g., see FIGS. 10 or 13). However, network devices, such as the CM 16 or the CPE 18, may be also have a network address dynamically or statically assigned by a network external to the data-over-cable system 10. For example, the CM 16 or the CPE 18 may be assigned a dynamic or static IP 54 address by an Ethernet LAN external to the data-over-cable system 10. It is often desirable not to interfere with the IP 54 addresses or other network addresses assigned by an external network. The IP 54 addresses or other addresses assigned by the external network can be grouped to create a "virtual network," such as a Virtual Private Network ("VPN") or a Virtual Local Area Network ("VLAN") that can be used by the data-over-cable system 10 to provide a desired networking service.

Figure 14:
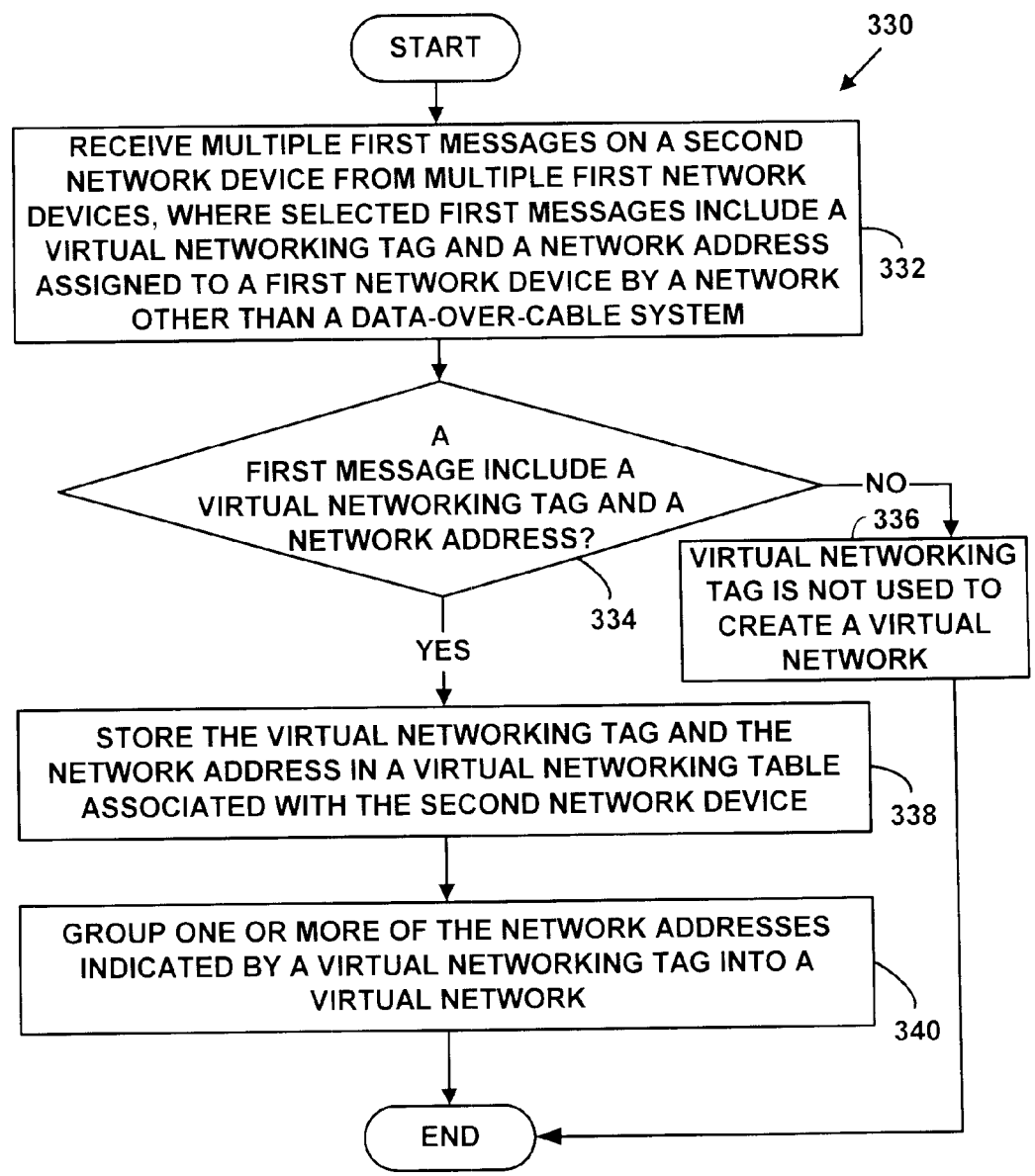
FIG. 14 is a flow diagram illustrating a method for virtual network administration in a data-over-cable system.

FIG. 14 is a flow diagram illustrating a Method 330 for virtual network administration in a data-over-cable system. At Step 332, multiple first messages are received on a second network device on a data-over-cable system from multiple first network devices. Selected first messages from selected first networking devices include a virtual networking tag and a network address. The virtual networking tag is used to request a desired networking service via a data-over-cable system (e.g., a networking service on a virtual network). The network address is assigned to a first network device by a network other than the data-over-cable system. At Step 334, a test is conducted to determine whether a first message includes a virtual networking tag and a network address. If a first message does not include a virtual networking tag and a network address at Step 334, the virtual network tag is not used to create a virtual network at Step 336. If a first message includes a virtual networking tag and a network address at Step 334, the network address and the first virtual networking tag are stored in virtual networking table associated with the second network device at Step 338. At Step 340, one or more of the network addresses from one or more first messages are grouped into a "virtual network" indicated by the virtual networking tag. The virtual networking tag allows the second network device to provide selected first network devices a desired networking service on a virtual network via the data-over-cable system.

In one preferred embodiment of the present invention, the first network devices are CMs 16, the second network device is the CMTS 12, the first messages are MAC 44 registration messages, the network addresses are IP 54 addresses included in an IP 54 packet in a MAC 44 frame. The virtual networking tag is a Virtual Local Area Network ("VLAN") tag in a MAC 44 header. However, other network devices (e.g., CPEs 18) and virtual networking tags can also be used, and the present invention is not limited to CMs 16, the CMTS 12, or a VLAN tag in a MAC 44 header.

In one preferred embodiment of the present invention, Method 330 is used to allow the CMTS 12 to obtain network addresses, such as IP 54 addresses, for CMs 16 or CPEs 18, that have been assigned by a network, such as an Ethernet LAN, on a network other than the data-over-cable system 10. The network addresses are used to provide a desired networking service to network devices on a "virtual network" via the data-over-cable system 10.

In such an embodiment, the IP 54 addresses are not assigned with DCHP 66 on the data-over-cable system 10 as was described above (e.g., see FIGS. 10 or 13). The external network may still use DHCP 66 to assign the IP 54 addresses, but DHCP 66 is not used on the data-over-cable system 10 to assign an IP 54 address if a message includes a VLAN tag and an IP 54 address. In such an embodiment, use of the VLAN tags is managed and/or restricted on the data-over-cable system using SNMP 64.

In one preferred embodiment of the present invention, the VLAN tag is a four-byte number added to a MAC 44 header to allow network devices on a common physical LAN, that have been assigned IP 54 addresses, to be grouped into separate VPNs or VLANs. In one exemplary preferred embodiment of the present invention, the VLAN tag is defined by the IEEE 802.1Q standard for VLANs, incorporated herein by reference. More information on the IEEE 802.1Q standard can be found at the URL "www.ieee.org." However, other VLAN tags can also be used and the present invention is not limited to IEEE 802.1Q VLAN tags, or MAC 44 VLAN tags.

In one preferred embodiment of the present invention, the VLAN tag is set dynamically by a network device. For example, the VLAN tag can be set dynamically by a Network Interface Card ("NIC") on a network device on a network (e.g., an Ethernet network) external to the data-over-cable system 10. In another preferred embodiment of the present invention, the VLAN tag is set statically through vendor specified data in a configuration file. For example, the VLAN tag can be set statically by including the a value for the VLAN tag in TLV format in a configuration file (e.g., Table 10) used to initialize a network device such as the CM 16 or CPE 18, as was described above.

In one preferred embodiment of the present invention, the virtual networking tag is also used to request a service class for a desired networking service including Class-of-Service ("CoS"), Quality-of-Service ("QoS"), Type-of-Service ("ToS"), Service Level Agreements ("SLA") or other service classes. The desired networking service is used on a virtual network via the data-over-cable system 10.

As is known in the art, CoS typically provides a reliable (e.g., error free, in sequence, u with no loss of duplication) transport facility independent of the quality-of-service. CoS parameters include maximum downstream data rates, maximum upstream data rates, upstream channel priority, guaranteed minimum data rates, guaranteed maximum data rate and other parameters. QoS typically specifies the performance of a network service that a device expects on a network. QoS parameters include transit delay expected to deliver data to a specific destination, the level of security protection from unauthorized monitoring or modification of data, cost for delivery of data, expected residual error probability, the relative priority associated with the data and other parameters. ToS typically specifies network tradeoffs that can be made to deliver data. ToS parameters include minimize delay, maximize throughput, maximize reliability, minimize monetary cost and other parameters. Service Level Agreements ("SLA") typically includes an agreement between a user and a service provider, defining a nature for a provided service and establishing a set of metrics to be used to measure a level of service provided against an agreed upon level of service (e.g., VoIP service). SLA parameters may include CoS, QoS and/or ToS parameters for a desired service.

Multiple virtual networks for multiple different service classes can be created with Method 330 by using more than one virtual networking tag with the first messages. The virtual networking tags allow the second network device, such as a CMTS 12, to provide a desired networking service to selected first network devices on multiple "virtual networks" via the data-over-cable system 10. The multiple virtual networks are provided via the data-over-cable system at network addresses assigned to multiple first network devices by a network other than the data-over-cable system 10 based on the multiple virtual networking tags.

Virtual Network Service Administration in a Data-over-cable System

It is often desirable to provide end-to-end connectivity, including point-to-point, and point-to-multipoint connectivity, for voice connectivity, voice conferencing, and video conferencing with real-time data, or near real-time data between a data-over-cable system 10 and an external network. The point-to-point and point-to-multipoint connectivity can be achieved on networks capable of delivering multiple levels of networking services including services classes, end-to-end. It is currently difficult to connect a data-over-cable system 10 to an external network and provide multiple levels networking services, such as CoS, QoS, ToS, SLA, end-to-end. The data-over-cable system 10 may not be able have a connection to a desired external network and thus require the services of another network, such as a transport network, to provide a desired networking service end-to-end.

For example, a first CPE 18 may on first Ethernet LAN may have access to a CM 16 connected to the Ethernet LAN and to the data-over-cable system 10. The first CPE 18 may desire an end-to-end service (e.g., VoIP) with a desired service class (e.g., CoS, QoS, ToS, SLA, etc.) to a second CPE 18 on a second Ethernet LAN. However, the data-over-cable system 10 may not have a connection to the second CPE 18 on the second Ethernet LAN to provide the desired service class for the desired end-to-end networking service. Thus, the data-over-cable system 10 may have to use a transport network that can achieve a connection to the second CPE 18 to provide the desired service class for the desired end-to-end networking service.

Figure 15:
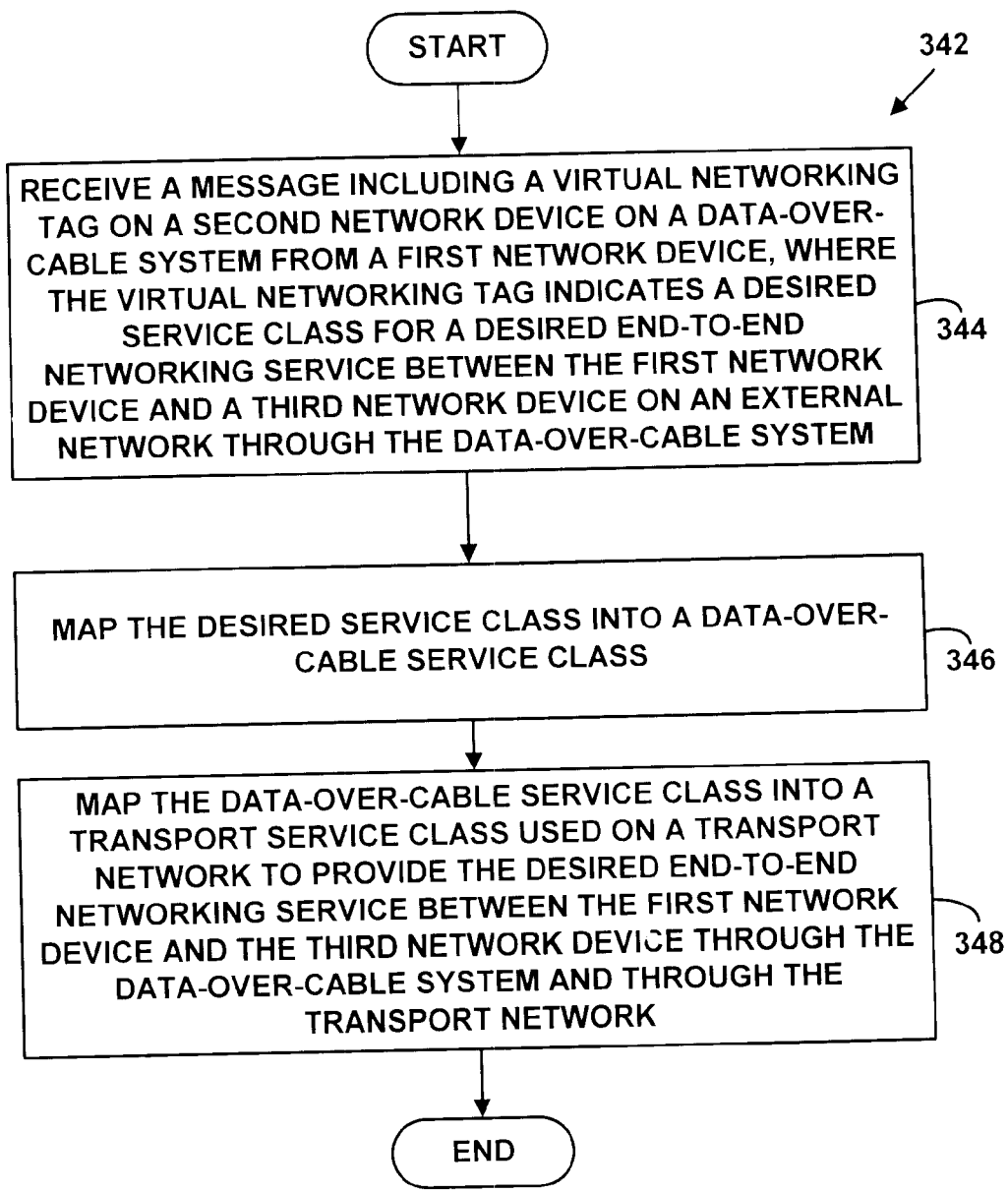
FIG. 15 is a flow diagram illustrating a method for virtual network service administration in a data-over-cable system.

FIG. 15 is a flow diagram illustrating a Method 342 for virtual network service administration in a data-over-cable system. At Step 344, a message with a virtual networking tag is received on a second network device on a data-over-cable system from a first network device connected to the data-over-cable system and to a first external network. The virtual networking tag indicates a desired service class for a desired end-to-end networking service between the first network device and a third network device on a second external network. At Step 346, the desired service class for the desired end-to-end networking service class is mapped into a data-over-cable service class. At Step 348, the data-over-cable service class is mapped into a transport service class for a transport service used on a transport network to provide the desired service class for the desired end-to-end networking service between the first network device, through the data-over-cable system, through the transport network, and to the third network device on the second external network.

In one preferred embodiment of the present invention in Method 342, the first network device is a CM 16, the second network device is the CMTS 12, the message is a MAC 44 message, and the virtual networking tag is a Virtual Local Area Network ("VLAN") tag in a MAC 44 header. In one exemplary preferred embodiment of the present invention, the VLAN tag is an IEEE 802.1Q VLAN tag. In another exemplary preferred embodiment of the present invention, the VLAN tag is a non-IEEE 802.1Q (e.g., another MAC 44 tag). However, other network devices and virtual networking tags can also be used, and the present invention is not limited to CMs 16, the CMTS 12, or a VLAN tag in a MAC 44 header.

The VLAN tag is used to request a desired service class for a desired end-to-end networking service such as CoS, QoS, ToS, SLA or other desired service classes. The transport service class includes service classes for transport services such as ADSL, ATM, Frame Relay, ISDN, SONET, VoIP and others. In one embodiment of the present invention, the transport services are provided by PSTN 22. In another embodiment of the present invention, transport services are provided by a transport network other than the PSTN 22.

In one preferred embodiment of the present invention, at Step 348 of Method 342, data from a message with a virtual networking tag is mapped to a selected transports port on a transport device (e.g., ATM port on an ATM switch), wherein the selected transport port provides a desired transport service class.

In another preferred embodiment of the present invention, at Step 348 of Method 342, data from a message with a virtual networking tag is mapped to a packet bus port (e.g., a mini-port or a virtual port) on a network interface device such as a Windows NT server by Microsoft Corporation of Redmond, Wash. However, other network interfaces devices could also be used including, network servers by Netscape Corporation, of Mountain View, Calif., Sun network servers, by Sun Microsystems, of Mountain View, Calif., a Total Control Telephony Hub, by 3Com Corporation, of Santa Clara, Calif., and other network interface devices. This mapping allows trigger points for desired service classes to be used by applications on network interfaces devices running operating systems such as Windows 95/98/NT, by Microsoft Corporation of Redmond, Wash., UNIX, by Digital Equipment Corporation, of Boston, Mass., and other operating systems. However, other windowed and non-windowed operating systems could also be used by applications to provide trigger points for desired service classes.

In another preferred embodiment of the present invention, a network address assigned by other than the data-over-cable system can also be used with the virtual networking tag to provide a desired service class for a desired end-to- end networking service on a virtual network via a data-over-cable system for the first network device (e.g., with Method 330 of FIG. 14).

In yet another preferred embodiment of the present invention, the virtual networking tag is used to provide a desired service class on virtual network in a secure virtual tunnel. In such an embodiment, Methods 330, 342 are both used with a network address assigned by a network other than the data-over-cable system. Data is sent to and from network devices in a secure virtual tunnel over a virtual network. As is known in the art, a virtual tunnel can be created by encapsulating a data packet inside another data packet. For example, an outer header is added before an inner header of a data packet. The outer header identifies the "endpoints" of the tunnel. The inner header identifies the original sender and recipient of the data.

Virtual tunnels are often created using IP-in-IP packet encapsulation. For more information on virtual tunneling using IP-in-IP packet encapsulation, see RFC-1853, incorporated herein by reference. Secure virtual tunnels are typically created by using some type of security on data packets used to create tunnel packets. For example, IP 54 security ("IPsec") can be used. For more information in IPsec see "Security Architecture for the Internet Protocol," IETF Internet Draft <draft-ietf-ipsec-arch-sec-07.txt>, July 1998, incorporated herein by reference.

In yet another embodiment of the present invention, Method 342 is used to provide a desired service class to multiple first network devices (e.g., multiple CMs 16 or CPEs 18) using the virtual networking tag. For example, Method 342 can be used to provide a conference call to multiple networks devices using VoIP.

In yet another embodiment of the present invention, Method 342 is used to provide multiple desired service classes to multiple first network devices. For example, a first network device may desire a first QoS for VoIP, a second network device may desire an IP CoS, etc. Method 342 can provide multiple desired service classes to multiple first network devices. Method 342 can also be combined with Method 330 to provide multiple desired service classes to multiple first network devices over a virtual network using a network address assigned the multiple first network devices by a network other than the data-over-cable system.

Exemplary Service Class Mapping

In one exemplary preferred embodiment of the present invention, interface specifications for the CM 16 and associated equipment like the CPE 18 are defined in MCNS Data Over Cable Service Interface Specifications ("DOCSIS"). More information on DOCSIS for the CM 16 can be found at the URL "www.cablemodem.com." While DOCSIS interfaces facilitates a variety of data communications service offerings over cable networks, it primarily specifies the data handling between a head end CMTS 12 and a subscriber CM 16 (FIG. 1).

When integrating switches and routers for a transport network to provide a desired service class through a data-over-cable system 10, a variety of configuration issues arise. The configuration issues include configuration of physical and logical subnetworks, unicast and multicast data forwarding and routing services, DHCP 66 IP 54 administration, configuration file management, subscription and security, and end-to-end SLAs and QoS.

DOCSIS interfaces typically address two problems common to shared-media architectures: bandwidth allocation and network security. An exemplary DOCSIS compliant data-over-cable system with or without telephony return may be used. In one preferred embodiment of the present invention, an exemplary DOCSIS data-over-cable system without telephony return (i.e., a two-way cable system) is used. In the downstream direction, exemplary DOCSIS systems typically operate in a broadcast mode, with specific addressing to a particular CM 16. The data is typically packaged in fixed, 188-byte Motion Pictures Expert Group ("MPEG") payloads, allowing the cable network 14 to support data/IP 54 traffic or native MPEG video. The packet payload is typically encrypted to ensure privacy. This effectively allows a head end CMTS 12 to establish any data rate to a target CM 16, and adjust that bandwidth in real-time as required.

In the upstream direction, in exemplary DOCISIS systems, shared bandwidth is typically organized around mini-slots, which are synchronized and managed on 6.25 microsecond intervals from a head end CMTS 12. Data is transmitted using variable frames which are binary multiples (1, 2, 4, . . . , 128) of mini-slots. With Quadrature Phase Shift Keying ("QPSK") modulation, a mini-slot consists of 16 bytes, and data frames can therefore vary from 16 to 2048 bytes. Mini-slots can either be reserved per CM 16, or a number can be allocated as a contention pool between all CMs 16 on the cable network 14. However, other modulation schemes can also be used.

Using these exemplary downstream and upstream transmission capabilities in an exemplary DOCSIS system, DOCSIS compliant devices can the support service classes illustrated in Table 11. However, more or fewer service classes may also be supported by DOCSIS compliant systems.

TABLE 11

1. Guaranteed service, by pre-assigning fixed amounts of bandwidth in the downstream or upstream direction as required.
2. Real-time variable bit rate (i.e., with delay guarantees), by reserving enough bandwidth and resources in the downstream and upstream directions so that the QoS objectives (i.e., loss and delay) can be statistically met
3. Non-real-time variable bit rate (i.e. without delay guarantees), by reserving enough bandwidth and resources in the downstream and upstream directions so that the QoS objectives (i.e., loss) can be statistically met.
4. Best-effort delivery, where the head-end allocates bandwidth in the downstream and upstream directions as required by the cable modems.

Method 342 allows a LAN (e.g., an Ethernet LAN), or an IP 54 network using CoS, QoS and/or ToS, to be mapped to DOCSIS service classes at defined cable service access points. The DOCSIS service classes provide necessary mapping to virtually any other transport topology service, including ADSL, ATM, Frame Relay, ISDN, SONET, VoIP and others that use service classes. The transport services may be provided by the PSTN 22 or other networks external to the data-over-cable system 10.

Exemplary DOCSIS-to-ATM Service Class Mapping

ATM was developed to take into account the bursty nature of packet traffic, while enabling a mixing of both synchronous and packet traffic types. Incoming traffic is segmented if necessary, then switched to its destination through intermediary switching and routing control nodes. ATM monitors the quality-of-service delivered. ATM uses statistical modeling of loading characteristics and network capacity limitations to ensure resources are not over-subscribed. ATM functions that ensure that QoS objectives are delivered include admission control, conformance monitoring or policing, scheduling, and congestion control.

In one exemplary preferred embodiment of the present invention, DOCSIS service classes in a data-over-cable system 10 are mapped to ATM service classes using Method 342. However, the present invention is not limited to DOCSIS service class-to-ATM service class mappings, and mapping from DOCSIS service classes to other transport topologies service classes could also be used (e.g., ADSL, Frame Relay, VoIP, ISDN, SONET, etc).

Figure 16:
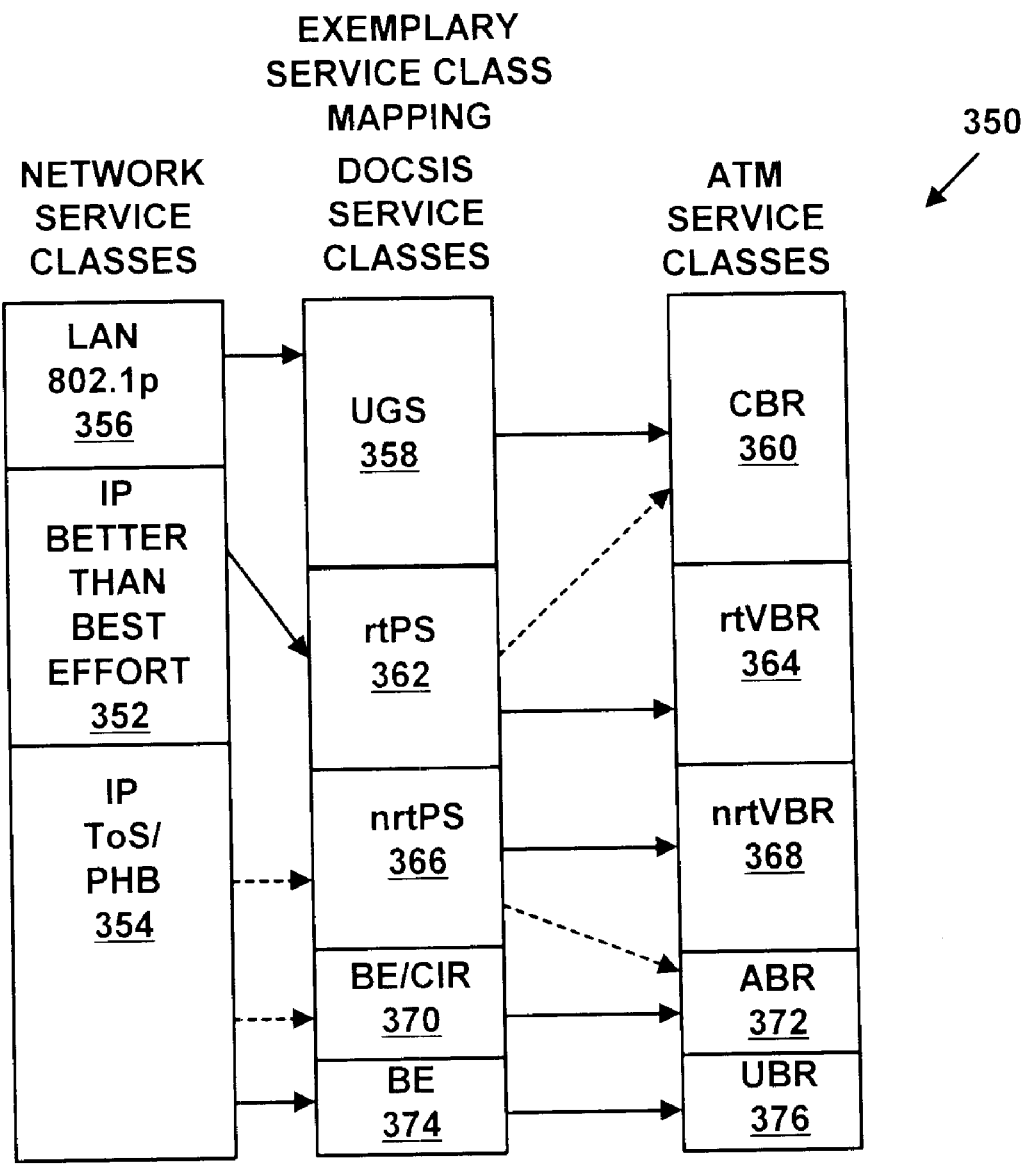
FIG. 16 is a block diagram illustrating exemplary service class mapping using the method of FIG. 15.

FIG. 16 is a block diagram 350 illustrating exemplary service class mapping using Method 342 of FIG. 15. As was discussed above, at Step 346 of Method 342, a desired service class indicated by a virtual networking tag is mapped into a data-over-cable service class (e.g., a DOCSIS service class).

A virtual networking tag from a first network device connected to a first external network (e.g., data network 28) and to the cable network 14, may indicate a desired service class for a better-than-best effort IP 54 service. A better-than-best-effort IP 54 service class provides a more predictable delivery, availability, response time and security than a best-effort IP 54 service class. A best-effort IP 54 service class is typically provided by IP 54 networks like the data network 28 (e.g., the Internet or an intranet). A better-than-best effort IP 54 service class 352 is mapped into a DOCSIS real-time Polled Service ("rtPS") service class 362 (e.g., at Step 346, of FIG. 15). The DOCSIS rtPS service class 362 is intended for data that requires real-time delivery and is used to provide better-than-best-effort delivery.

One DOCSIS cable modem-to-customer interface specifies a 10BASE-T Ethernet to a subscriber LAN as a standard interface to the cable network 14 to service multiple client devices. One method for delivering IP-based CoS to an IP 54 application is to use ToS bits in an IP 54 header. For more information ToS in IP 54 see, RFC-1349, incorporated herein by reference. The IETF is defining new standard interpretations for the IP 54 ToS bits, which are being called Packet Hop Behavior ("PHB") bits. For more information on PHB, see IETF Internet Draft, "Management of PHBs," <draft-ietf-diffserv-phb-mgmt-00.txt>, August 1998, incorporated herein by reference. IETF RFCs and Internet drafts can be found at the URL "www.ietf.org."

In one embodiment of the present invention, an IP 54 based CoS using a ToS/PHB service class 354 is mapped to a DOCSIS Best Effort ("BE") service class 374. This mapping typically provides a best-effort connection without service guarantees. In one exemplary preferred embodiment of the present invention, this mapping is one default mapping being used until the IETF finalizes PHB standards since many network devices will not allow the use of PHB bits in IP 54 packets. This mapping provides a best effort connection without service guarantees.

Even though the IETF has not finalized the PHB standards, preferred embodiments of the present invention also allow use of the PHB bits in IP 54 packets for mapping the IP 54 ToS/PHB service classe 354 into other DOCSIS service classes. The DOCSIS service classes can then be mapped to other transport services classes (e.g., transport service classes for ADSL, ATM, Frame Relay, ISDN, SONET, VoIP, etc.).

In another embodiment of the present invention, an IP 54 CoS using a ToS/PHB service class 354 is mapped into a DOCSIS BE/Committed Information Rate ("CIR") service class 370. CIR refers to an average maximum transmission over a link, typically on a Frame Relay network. The mapping provides a best-effort connection with some service and bandwidth guarantees.

In yet another embodiment of the present invention, an IP 54 CoS using a ToS/PHB service class 354 is mapped to a DOCSIS non-real-time Polled Service ("nrtPS") service class 366. This mapping provides a non-real-time connection with some service guarantees.

There are typically problems using ToS/PHB service class 354 to police a class of service within a subscriber LAN external to the data-over-cable system 10. The ToS/PHB service class 354 typically lacks the capability to police traffic on a local LAN that does not originate or terminate across a cable network 24. In addition, many IP 54 applications do not have the mechanisms in their IP 54 stacks for writing precedence, ToS bits, or PHB bits into an IP 54 packet.

An IEEE 802.1p service class standard is often used in networks in place of the ToS/PHB service class 354. The 802.1p service class standard allows up to eight traffic classes, a different number of priorities on different ports, multicast filtering, and queuing priority on LANs that have no access priorities (e.g., an Ethernet LAN). Unlike the ToS/PHB service class 354, the 802.1p standard class delivers a uniformly interpreted, standard mechanism for CoS (e.g., over Ethernet). The IEEE 802.1p service class standard, is incorporated herein by reference. In one embodiment of the present invention, 802.1p service classes 356 are mapped to a DOCSIS Unsolicited Grant Services ("UGS") service class 358. This mapping typically provides a dedicated connection with a defined bandwidth for multiple service classes on multiple ports.

A mapping for three exemplary desired services classes, better-than-best effort service class 352, ToS/PHB service class 354, and 801.1p service class 356 (FIG. 16), were described for Step 346 of Method 342 (FIG. 15). However, other desired service classes for LANs, IP 54 networks, and other networks can also be used for the mapping into a data-over-cables service class, and the present invention is not limited to the three exemplary desired service classes described.

As was discussed above, at Step 348 of Method 342 (FIG. 15) a desired service class data-over-cable service class (e.g., a DOCSIS service class) is mapped into a transport service class for a transport service used on an external network. In one exemplary preferred embodiment of the present invention, a DOCSIS service class is mapped into an ATM service class. However, the present invention is not limited to DOCSIS-to-ATM mapping and other data-over-cable to transport mappings can also be used (e.g., ADSL, Frame Relay ISDN, SONET, VoIP, etc.)

Returning to FIG. 16, a DOCSIS Unsolicited Grant Service ("UGS") service class is intended for voice and video applications sensitive to delay and delay variation. An ATM Constant Bit Rate ("CBR") service class is intended for real-time applications requiring tightly constrained delay and delay variation, such as voice and video applications. A DOCSIS UGS service class 358 is mapped to an ATM CBR service class 360. This mapping typically provides a dedicated connection with a defined bandwidth.

A DOCSIS real-time Polled Services ("rtPS") is intended for data that requires real-time delivery. An ATM real-time Variable Bit Rate ("rtVBR") service class is intended for real-time services such as voice and video applications that transmit at a bit-rate that varies with time. A DOCSIS rtPS service class 362 is mapped to an ATM rtVBR service class 364. This mapping typically provides a defined bandwidth connection with defined service guarantees. In another embodiment of the present invention, the DOCSIS rtPS service class 362 may also be mapped to the ATM CBR service class 360.

A DOCSIS non-real-time Polled Services ("nrtPS") service class is intended to deliver data that does not require real-time delivery. An ATM non-real-time Variable Bit Rate ("nrtVBR") service class is intended for non-real-time services that have bursty traffic characteristics. A DOCSIS nrtPS service class 366 is mapped to an ATM nrtVBR service class 368. This mapping typically provides a non-real-time connection with some service guarantees.

A DOCSIS Best Effort ("BE") service class includes no specified parameters and no assurances that data will be delivered across a network to a target network device. A DOCSIS Committed Information Rate ("CIR") refers to an average maximum transmission over a link, typically on a Frame Relay network. An ATM Available Bit Rate ("ABR") service class includes transfer characteristics that may change subsequent to connection establishment. A DOCSIS BE/CIR 370 service class is mapped to an ATM ABR service class 372. This mapping typically provides a best-effort connection with some service guarantees. In another embodiment of the present invention, the DOCSIS nrtPS service class 366 may also be mapped to the ATM ABR service class 372.

A DOCSIS BE service class 374 includes no specified parameters and no assurances that data will be delivered across a network to a target network device. An ATM Undefined Bit Rate ("UBR") service class includes data that does not require tightly constrained delay and delay variations and expects non-continuous bursts. An DOCSIS BE service class 374 is mapped to an ATM UBR service class 376. This mapping typically provides a best-effort connection without service guarantees.

FIG. 16 illustrates exemplary service class mapping from an IP 54 network such as the Internet, or a LAN, to a DOCSIS compliant data-over-cable system, and to an ATM transport service. However, FIG. 16 is exemplary only, and other mappings for other network types could also be used. Method 340 may allow mapping of existing IP 54 and LAN (e.g., Ethernet) service classes, into data-over-cable service classes, and mapping of data-over-cable service classes to other transport service classes to extend subscriber access for a desired service class for a desired end-to-end networking service (e.g., CoS, QoS, ToS, SLA, etc.). Using method 342, subscriber access thus may be extended from a first external network, through a data-over-cable system 10, through a transport network, and to a second external network.

Figure 17:
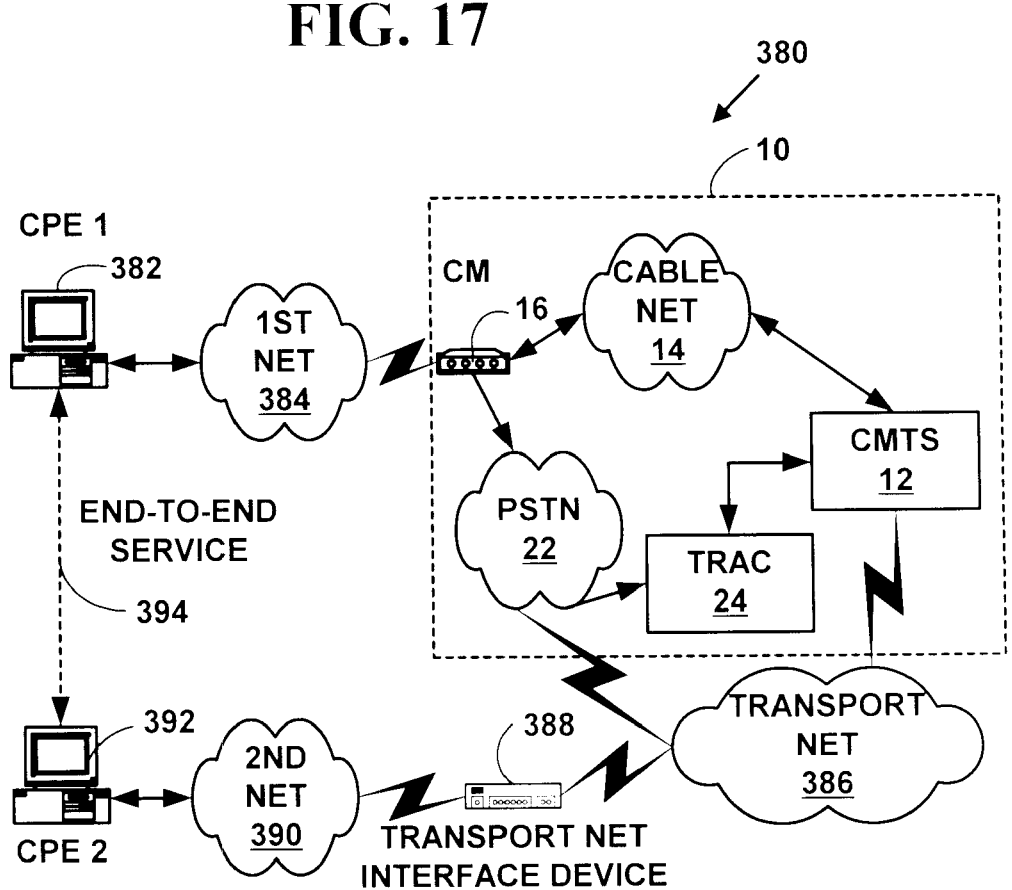
FIG. 17 is a block diagram visually illustrating a data flow for the Method of FIG. 15.

FIG. 17 is a block diagram 380 visually illustrating Method 342 of FIG. 15. A first CPE 382 on a first network 382 (e.g., an Ethernet LAN) makes a request with a virtual networking tag for a desired service class for a desired end-to-end networking service. The first network 384 is connected to a CM 16, which is also connected to a cable network 14. A CMTS 12 on the cable network 14 receives the request (e.g., at Step 344, FIG. 15) with the virtual network tag and maps the desired service class into a data-over-cable service class (e.g., at Step 346, FIG. 15). The CMTS 12 maps the data-over-cable service class into a transport service class (e.g., at Step 348, FIG. 15) for a transport network 386. The transport network transports the request to a transport network interface device 388 connected to the transport network 386 and a second network 390. In one embodiment of the present invention, the transport services are provided by PSTN 22. In another embodiment of the present invention, transport services are provided by a transport network other than the PSTN 22 (e.g., a private transport network). The transport network device sends the request to a second CPE 392 to provide a desired service class for a desired end-to-end networking service 394 between the first CPE 382 and the second CPE 392 through the data-over-cable system 10.

In another preferred embodiment of the present invention, a desired service class for the des, ed end-to-end networking service class indicated by the virtual networking tag is mapped directly into a transport service class by the second network device. In such an embodiment, the step of mapping the desired service class into a data-over-cable service class is not completed.

Figure 18:
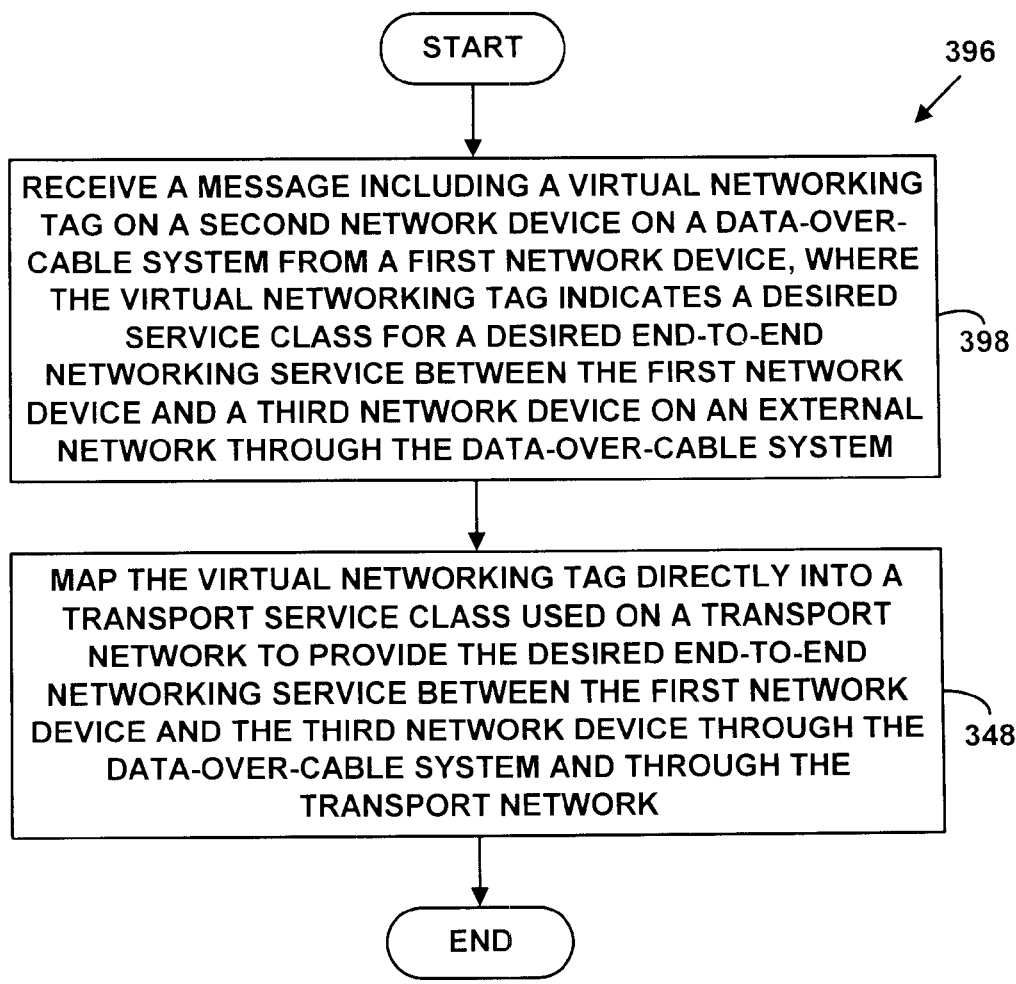
FIG. 18 is a flow diagram illustrating a method for virtual network administration.

FIG. 18 is a flow diagram illustrating a Method 396 for virtual network administration. At Step 398, a message with a virtual networking tag is received on a second network device on a data-over-cable system from a first network device connected to the data-over-cable system and to a first external network. The virtual networking tag indicates a desired service class for a desired end-to-end networking service between the first network device and a third network device on a second external network. At Step 400, the virtual network tag is mapped directly into a transport service class for a transport service used on a transport network to provide the desired service class for the desired end-to-end networking service between the first network device, through the data-over-cable system, through the transport network, and to the third network device on the second external network.

As was discussed above, the virtual networking tag can also be used to provide a virtual network via a data-over-cable system for the first network device. Method 330 (FIG. 14) can be combined with Method 342 (FIG. 15) to provide a desired end-to-end networking service to a group of network devices (e.g., CMs 16 or CPEs 18) over a virtual network, via and/or through the data-over-cable system 10.

Method 330 allows a virtual networking tag to be used with a network address assigned by other than a data-overcable system to be used by a CMTS 12 to provide a virtual network to one or more CMs 16 via a data-over-cable system 10. Method 342 allows a virtual networking tag to be used by a CM 16 or CPE 18 to request a desired service class for an end-to-end networking service from a CMTS 12 on a data-over-cable 10. The desired end-to-end networking service is provided through a data-over-cable system and through a transport network using one or more service class mappings. Thus, preferred embodiments of the present invention may provide a variety of network service offerings via and through a data-over-cable system.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. In a data-over-cable system including a plurality of network devices, a method for providing virtual network administration, comprising the following steps:

receiving a plurality of first messages on a second network device on a data-over-cable system from a plurality of first network devices, wherein selected first messages from selected first network devices include a virtual networking tag and a network address, wherein the virtual networking tag is used to request a desired networking service on a virtual network, and wherein the network address is assigned to a first network device by a network other than the data-over-cable system;

determining whether a first message includes a virtual networking tag and a network address, and if so, storing the network address and the virtual networking tag in virtual networking table associated with the second network device;

grouping one or more of the network addresses into a virtual network indicated by a virtual networking tag, wherein the virtual networking tag allows the second network device to provide selected first network devices a desired networking service on the virtual network via the data-over-cable system.

2. A computer readable medium having stored therein instructions for causing a central processing unit to execute the method of claim 1.

3. The method of claim 1 wherein the plurality of first network devices are cable modems and the second network device is a cable modem termination system.

4. The method of claim 1 wherein the virtual networking tag is a Medium Access Control Protocol tag and the network address is an Internet Protocol address.

5. The method of claim 1 wherein the step of storing network addresses includes storing the network address in an Address Resolution Protocol table associated with the second network device.

6. The method of claim 1 further comprising:

receiving the second message on a second network device on the data-over-cable system from another first network device from the plurality of first network devices, wherein the second message includes the virtual networking tag received in the first message; and sending the second message over the virtual network indicated by the virtual networking tag to selected ones of the first network devices at network addresses stored in the virtual networking table associated with the second network device.

7. The method of claim 1 further comprising:

receiving a plurality of first messages on the second network device on the data-over-cable system from the plurality of first network devices, wherein the plurality of first messages include a plurality of different virtual networking tags and a plurality network addresses, and wherein the network address is assigned to a first network device by a network other than the data-over-cable system;

grouping the plurality network addresses into a plurality of virtual networks indicated by the plurality of different virtual networking tags, wherein the plurality of virtual networking tags allow the second network device to send messages on the plurality of virtual networks to selected ones of the plurality of first network devices at network addresses assigned to the plurality of first network devices by a network other than the data-over-cable system.

8. In a data-over-cable system including a plurality of network devices, a method for providing virtual network administration, comprising the following steps:

selecting a value for a virtual networking tag on a first network device to request a desired networking service for the first network device;

adding the selected value to the virtual networking tag in a plurality of messages on the first network device;

sending the plurality of messages to a second network device on the data-over-cable system, wherein the second network device uses the selected value from the virtual networking tag from the plurality of messages to provide a desired networking service for the first networking device via the data-over-cable system.

9. A computer readable medium having stored therein instructions for causing a central processing unit to execute the method of claim 8.

10. The method of claim 8 wherein the first network device is a cable modem and the second network device is a cable modem termination system.

11. The method of claim 8 wherein the virtual networking tag is a Medium Access Control Protocol tag.

12. The method of claim 8 wherein the selected value for the virtual networking tag is used to request any of class-of-services, quality-of-services, type-of-services, or service level agreements for a desired networking service.

13. The method of claim 8 wherein the step of selecting a value for a virtual networking tag includes dynamically selecting a value for the virtual networking tag from a network interface and associated with the first network device.

14. The method of claim 8 wherein the step of selecting a value for a virtual networking tag includes statically selecting a value for the virtual networking tag from a configuration file used to initialize the first network device.

15. In a data-over-cable system including a plurality of network devices, a method for providing virtual network service administration, comprising the following steps:

receiving a message with a virtual networking tag on a second network device on the data-over-cable system from a first network device connected to the data-over-cable system and a first external network, wherein the virtual networking tag indicates a desired service class for desired end-to-end networking service between the first network device and a third network device on a second external network;

mapping the desired service class for the desired end-to-end networking service class into a data-over-cable service class; and mapping the data-over-cable service class into a transport service class for a transport service used on a transport network to provide the desired service class for the desired end-to-end networking service between the first network device and the third network device on the second external network through the data-over-cable system and through the transport network.

16. A computer readable medium having stored therein instructions for causing a central processing unit to execute the method of claim 15.

17. The method of claim 15 wherein first network device is a cable modem and the second network device is a cable modem termination system.

18. The method of claim 15 wherein the virtual networking tag is a Medium Access Control Protocol tag.

19. The method of claim 15 wherein the transport service includes any of Asymmetric Digital Subscriber Line, Asynchronous Transfer Mode, Frame Relay, Integrated Services Digital Network, Voice over Internet Protocol, or Synchronous Optical Network transport services.

20. The method of claim 15 wherein the first external network and second external networks are any of a wide area network or a local area network.

21. The method of claim 15 wherein the virtual networking tag is used to request any of class-of-services, quality-of-services, type-of-services or service level agreements for a desired end-to-end networking service.

22. The method of claim 15 wherein the step of mapping the desired service class for the desired end-to-end networking service class into a data-over-cable service class includes mapping an Internet Protocol service class into a Data Over Cable Interface Specification service class.

23. The method of claim 15 wherein the step of mapping the desired service class for the desired end-to-end networking service class into a data-over-cable service class includes mapping a Medium Access Control protocol service class into a Data Over Cable Interface Specification service class.

24. The method of claim 15 wherein the step of mapping the data-over-cable service class into a transport service class for a transport service used on the external network includes mapping Data Over Cable Interface Specification quality-of-service class into a transport service quality-of-service class.

25. The method of claim 24 wherein the transport service quality-of-service class includes any of Asynchronous Transfer Mode, Frame Relay, Integrated Services Digital Network, Voice over Internet Protocol, Synchronous Optical Network, or Asymmetric Digital Subscriber Line, quality-of-service classes.

26. The method of claim 15 wherein the virtual networking tag is used to create a virtual network including the first network device via the data-over-cable system.

27. The method of claim 15 wherein the step of mapping the data-over-cable service class into a transport service class for a transport service includes mapping data from the message onto a transport port on a transport device used to provide the transport service class.

28. The method of claim 15 wherein the step of mapping the data-over-cable service class into a transport service class for a transport service includes mapping data from the message into data packets for a secure virtual tunnel for transport services over a virtual network.

29. The method of claim 15 wherein the step of mapping the data-over-cable service class into a transport service class for a transport service includes mapping data from the message to a packet bus port on a network interface device running a windowed operating system, wherein the mapping allows trigger points for desired transport service classes to be used by applications on the network interface device.

30. The method of claim 29 wherein the windowed operation system is any of a Windows NT, Windows 95 or Windows 98 operating systems.

31. In a data-over-cable system including a plurality of network devices, a method for providing virtual network service administration, comprising the following steps:

receiving a message with a virtual networking tag on a second network device on the data-over-cable system from a first network device connected to the data-over-cable system and a first external network, wherein the virtual networking tag indicates a desired service class for desired end-to-end networking service between the first network device and a third network device on a second external network; and mapping the virtual networking tag directly into a transport service class for a transport service used on a transport network to provide the desired end-to-end networking service between the first network device and the third network device on the second external network through the data-over-cable system and through the transport network.

32. A computer readable medium having stored therein instructions for causing a central processing unit to execute the method of claim 31.

33. In a data-over-cable system including a plurality of network devices, a method for providing virtual network administration, comprising the following steps:

receiving a plurality of Medium Access Control messages on a cable modem termination system on the data-over-cable system from a plurality of cable modems, wherein selected Medium Access Control messages include a virtual networking tag and an Internet Protocol address, wherein the virtual networking tag is used to request a desired networking service on a virtual network, and wherein the Internet Protocol address is assigned to a cable modem device by a network other than the data-over-cable system;

determining whether a Medium Access Control message includes the virtual networking tag and an Internet Protocol address, and if so, storing the Internet Protocol address and the virtual networking tag in a virtual networking table associated with the cable modem termination system;

grouping one or more of the Internet Protocol addresses into a virtual network indicated by the virtual networking tag, wherein the virtual networking tag allows the cable modem termination system to provide a plurality of selected cable modems a desired end-to-end networking service on the virtual network via the data-over-cable system.

34. A computer readable medium having stored therein instructions for causing a central processing unit to execute the method of claim 33.

35. In a data-over-cable system including a plurality of network devices, a method for providing virtual network service administration, comprising the following steps:

receiving a message with a virtual networking tag on a cable modem termination system on the data-over-cable system from a cable modem connected to the data-over-cable system and a first local area network, wherein the virtual networking tag indicates a desired service class for desired end-to-end networking service between the cable modem and another network device on a second local area network;

mapping the desired service class for the desired end-to-end networking service into a data-over-cable service class; and mapping the data-over-cable service class into a transport service class for a transport service used on a transport network to provide the desired end-to-end networking service between the cable modem and another network device on the second local area network through the data-over-cable system and through the transport network.

36. A computer readable medium having stored therein instructions for causing a central processing unit to execute the method of claim 35.

* * * * *